United States Patent
Kim et al.

(10) Patent No.: US 11,570,702 B2
(45) Date of Patent: Jan. 31, 2023

(54) HOME APPLIANCE CONNECTION METHOD AND HOME APPLIANCE CONNECTION DEVICE

(71) Applicant: LG ELECTRONICS INC., Seoul (KR)

(72) Inventors: Jonggon Kim, Seoul (KR); Hankyul You, Seoul (KR); Suhyun Park, Seoul (KR); Woonsuk Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 17/264,114

(22) PCT Filed: Jun. 19, 2019

(86) PCT No.: PCT/KR2019/007368
§ 371 (c)(1),
(2) Date: Jan. 28, 2021

(87) PCT Pub. No.: WO2020/141667
PCT Pub. Date: Jul. 9, 2020

(65) Prior Publication Data
US 2021/0314855 A1    Oct. 7, 2021

(30) Foreign Application Priority Data

Dec. 31, 2018   (KR) ......................... 10-2018-0173585

(51) Int. Cl.
*H04W 48/16*        (2009.01)
*H04W 4/80*         (2018.01)
(Continued)

(52) U.S. Cl.
CPC ......... *H04W 48/16* (2013.01); *H04L 12/2803* (2013.01); *H04W 4/80* (2018.02); *H04W 48/18* (2013.01); *H04L 2012/2841* (2013.01)

(58) Field of Classification Search
CPC ..... H04W 84/12; H04W 48/16; H04W 76/10; H04W 88/04
See application file for complete search history.

(56) References Cited

U.S. PATENT DOCUMENTS 10,419,908 B1 *   9/2019  Hutz ................... H04L 61/6022
2014/0369232 A1  12/2014  Kim et al.
(Continued)

FOREIGN PATENT DOCUMENTS

| CN | 105991380 A | 10/2016 |
| JP | 2015-46387 A | 3/2015 |
| KR | 10-2017-0077316 A | 7/2017 |

*Primary Examiner* — Kevin Kim
(74) *Attorney, Agent, or Firm* — Birch, Stewart, Kolasch & Birch, LLP

(57) ABSTRACT

A home appliance connection method according to embodiments of the present invention may comprise the steps of: setting a wireless mode to a station mode; periodically searching for a wireless network on the basis of the station mode; and, when a wireless network search request is received from a terminal device, transmitting found wireless network information to the terminal device. A home appliance connection method according to embodiments of the present invention may further comprise a step in which the terminal device receives found wireless network information, wherein the found wireless network information of the terminal device may be information from which a wireless network not associated with a home appliance for the terminal device has been filtered. A home appliance connection method according to embodiments of the present invention may further comprise a step of, when the wireless mode is a station mode, periodically changing the wireless mode into an access point (AP) mode and periodically transmitting a beacon message to the terminal device on the basis of the AP mode. A home appliance connection method according to embodiments of the present invention may (Continued)

comprise a step of receiving a first advertising message on the basis of a Bluetooth from the terminal device, wherein the first advertising message may comprise a home appliance registration request. Furthermore, a home appliance connection method may comprise the steps of: transmitting a second advertising message to the terminal device on the basis of the Bluetooth in response to the first advertising message; and searching for a wireless network in response to the first advertising message.

14 Claims, 20 Drawing Sheets

(51) Int. Cl.
     *H04L 12/28*      (2006.01)
     *H04W 48/18*      (2009.01)

(56)                References Cited

U.S. PATENT DOCUMENTS

2018/0313544 A1    11/2018  Lee et al.
  2020/0021456 A1*   1/2020  Wu ........................ H04L 12/22
  2020/0314958 A1*  10/2020  Kim ..................... H04W 88/06

* cited by examiner

HOME APPLIANCE CONNECTION METHOD AND HOME APPLIANCE CONNECTION DEVICE

CROSS REFERENCE TO RELATED APPLICATIONS

This application is the National Phase of PCT International Application No. PCT/KR2019/007368, filed on Jun. 19, 2019, which claims priority under 35 U.S.C. 119(a) to Patent Application No. 10-2018-0173585, filed in the Republic of Korea on Dec. 31, 2018, all of which are hereby expressly incorporated by reference into the present application.

TECHNICAL FIELD

The present disclosure relates to home appliance. More particularly, the present disclosure relates to a home appliance connection method and a home appliance connection device in which the home appliance is connected to a wireless network via communication with an external terminal device and thus is controlled based on a control signal from the external terminal device via the connected wireless network.

The present disclosure relates to a home appliance connection method and a home appliance connection device in which a relationship between a terminal device, a home appliance, and a wireless network is configured such that the home appliance searches for the wireless network and the home appliance is registered onto a server via the wireless network.

The present disclosure relates to a home appliance connection method and a home appliance connection device in which a terminal device may control a home appliance, and specifically, a user of the terminal device may control wireless network searching as performed by the home appliance, and a registration process of the home appliance.

BACKGROUND ART

The home appliance may include all of a variety of products such as washing machines, refrigerators, and robot vacuum cleaners. The home appliance may have a user interface, and a user may perform wireless network access to the home appliance via the user interface of the home appliance.

The home appliance may include a communication module and thus be connected to a wireless network using the communication module. The home appliance may be connected to an external terminal device over the wireless network. The user of the terminal device may perform searching of a wireless network connected to the home appliance via the user interface of the terminal device and may be connected to the home appliance.

In a process in which the terminal device searches for a wireless network to be connected to the home appliance in a space where the home appliance, the wireless network, or the terminal device is located, the terminal device may not accurately search for the wireless network. Since the terminal device sends a wireless network command and the home appliance is actually connected to the terminal device via the wireless network, it is necessary to accurately search for the wireless network based on a position in the space.

The home appliance herein may include all of various products. Depending on a type of the home appliance, the home appliance may not have a user interface. There is a need to simplify operations in which the home appliance searches for the wireless network and is connected thereto.

Further, depending on the product type of the home appliance, the home appliance may receive power in a wired manner, and may receive power from a battery. In both the cases, a lot of power may be consumed when the home appliance searches for the wireless network and maintains the connection thereto.

DISCLOSURE

Technical Purpose

A home appliance connection device according to embodiments of the present disclosure is configured to accurately and quickly perform wireless access point search as requested from a terminal device to the home appliance connection device.

A home appliance connection device according to embodiments of the present disclosure is configured to search for a wireless access point and accurately and quickly transmit wireless access point information as the searching result to the terminal device connected to the home appliance connection device.

A home appliance connection device according to embodiments of the present disclosure is configured to search for and set a wireless network as optimized for the home appliance and effectively reduce a searching duration.

A home appliance connection device according to embodiments of the present disclosure is configured to minimize a procedure including intervention of a user of a terminal device and a home appliance having the home appliance connection device in registering the home appliance having a limited user interface onto a server.

A home appliance connection device according to embodiments of the present disclosure is configured to minimize power consumption required for a home appliance connection device to search for a wireless network and to connect to the wireless network.

Technical Solutions

One aspect of the present disclosure provides a home appliance connection method comprising: setting a wireless mode to a station mode; periodically searching for a wireless network under the station mode; and upon receiving a wireless network searching request from a terminal device, transmitting information about a searched wireless network to the terminal device.

In one implementation of the home appliance connection method, 1, wherein the method further comprises receiving information about a wireless network searched by the terminal device, wherein in the information about the wireless network searched by the terminal device, a wireless network not associated with the home appliance associated with the terminal device is excluded in a filtered manner.

In one implementation of the home appliance connection method, 1, wherein the method further comprises: when the wireless mode is the station mode, periodically changing the wireless mode to an access point (AP) mode; and periodically transmitting a beacon message to the terminal device under the AP mode.

In one implementation of the home appliance connection method, 1, wherein the method further comprises: receiving a first advertising message from the terminal device via Bluetooth communication, wherein the first advertising message includes a registration request of the home appliance;

in response to receipt of the first advertising message, transmitting a second advertising message to the terminal device via Bluetooth communication; and searching for a wireless network in response to reception of the first advertising message.

Technical Effects

The home appliance connection device according to embodiments of the present disclosure may quickly and accurately deliver the wireless access point information to the terminal device associated with the home appliance connection device. Further, the home appliance connection device according to the present disclosure provides the wireless access point information to the terminal device associated with the home appliance connection device, so that the terminal device associated with the home appliance connection device may accurately and quickly perform the registration of the home appliance.

The home appliance connection device according to embodiments of the present disclosure may be applied to a home appliance with a limited user interface, so that the home appliance may be connected to a wireless access point.

The home appliance connection device according to embodiments of the present disclosure may allow the terminal device or the smart terminal device associated with the home appliance connection device to accurately and quickly deliver a wireless access point connection information list to a user.

The home appliance connection device according to embodiments of the present disclosure may allow the user of the terminal device to select wireless access point information to connect the home appliance to the wireless access point, and may perform the registration of the home appliance accurately and quickly.

The home appliance connection device according to embodiments of the present disclosure may search for and set a wireless network to be accessed by a home appliance requiring new registration thereof via BLE communication in a short time and using less power consumption. Further, the home appliance connection device may search for a wireless network optimized for the home appliance and connect the searched wireless network to the home appliance.

BRIEF DESCRIPTIONS OF DRAWINGS

Accompanying drawings which are included to allow further understanding of the present disclosure, and which constitute a portion of the present disclosure represent embodiments of the present disclosure together with detailed descriptions of principles of the present disclosure.

DETAILED DESCRIPTIONS

Figure 1:
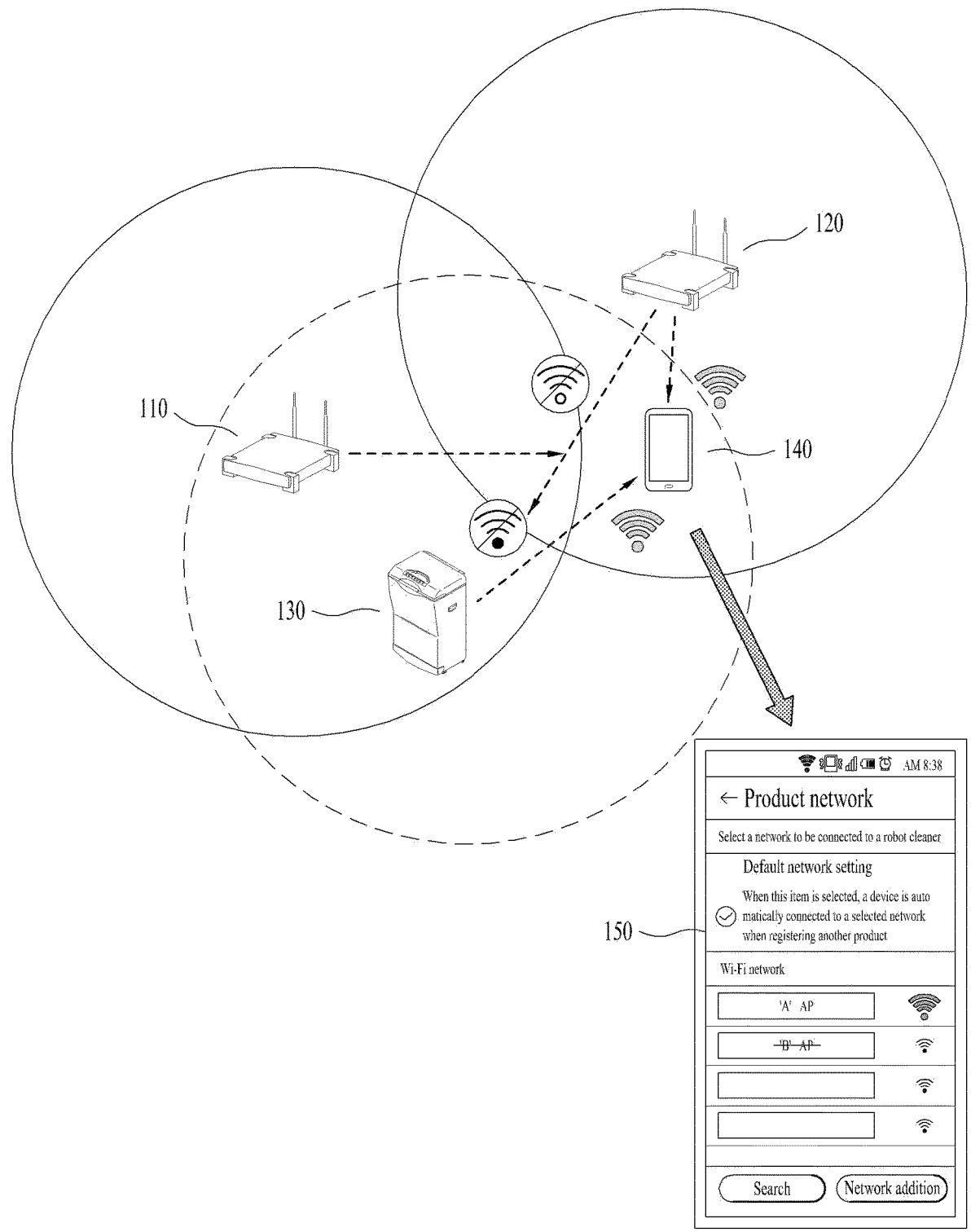
FIG. 1 shows an environment in which a terminal device searches for a wireless access point.

FIG. 1 shows an environment in which a terminal device searches for a wireless access point.

Referring to FIG. 1, a home appliance 130 according to embodiments of the present disclosure may be located in a space in which a terminal device 140 and wireless access points (APs) 110 and 120 are located. The terminal device may display wireless access point connection information 150 on a display of the terminal device. FIG. 1 shows an environment in which the home appliance is not contained in a coverage of an A wireless access point 120 and the home appliance is contained in a coverage of a B wireless access point 110. In one example, the terminal device is contained in the coverage of the A wireless access point and the terminal device is not contained in the coverage of the B wireless access point. In this connection, when the terminal device performs wireless access point search, the terminal device identifies only the A wireless access point as connectable wireless access point, and the B wireless access point as non-connectable wireless access point, and provides wireless access point information 150 based on the identification result to a user. However, since a wireless access point to which the home appliance may be connected for registration of the home appliance is the B wireless access point 130, the wireless access point information provided to the user may be inaccurate based on the actual environment of the home appliance. Therefore, connection of the home appliance to the wireless access point may fail.

Figure 2:
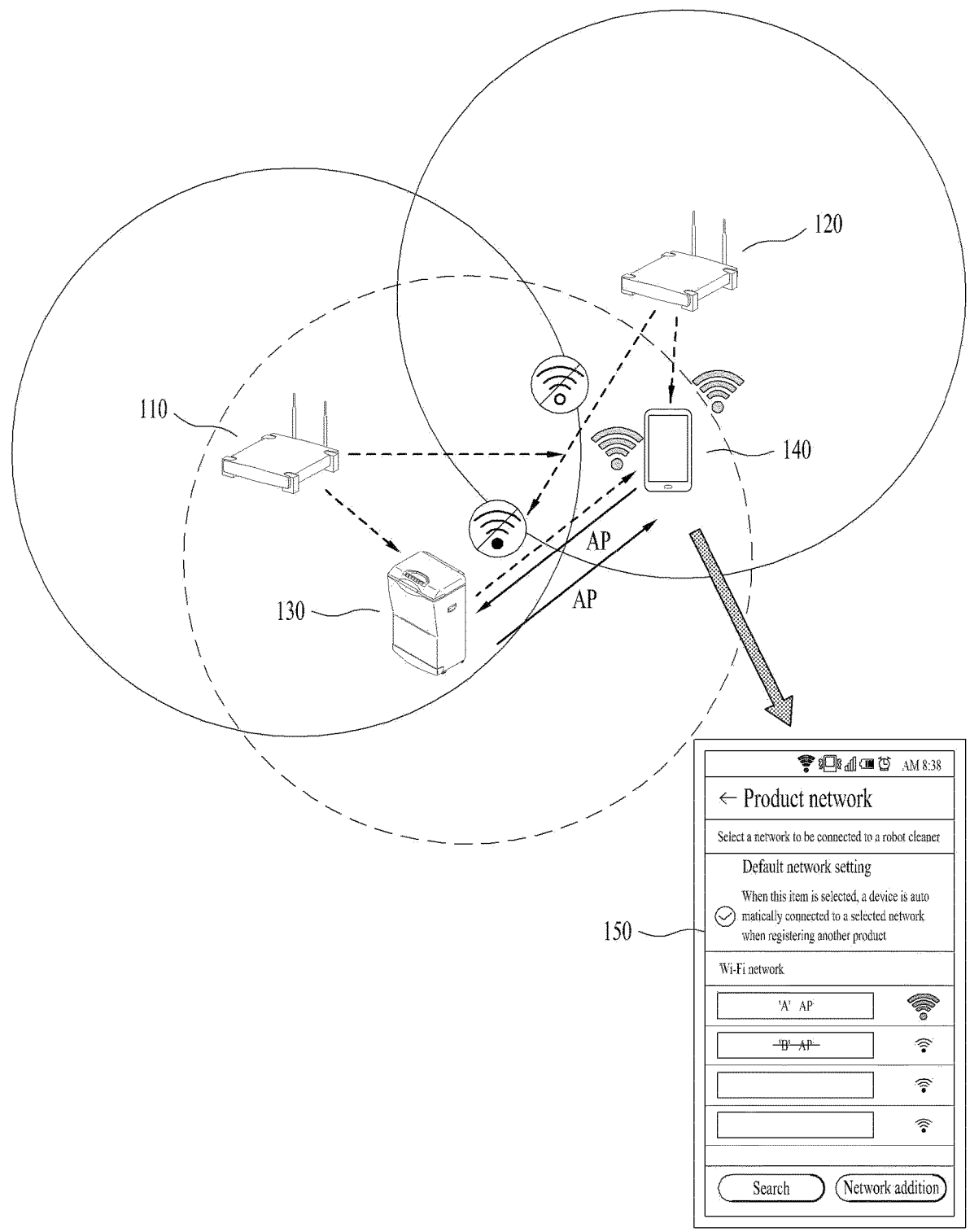
FIG. 2 shows an environment in which a home appliance connection device searches for a wireless access point.

FIG. 2 shows an environment in which a home appliance connection device searches for a wireless access point.

The home appliance connection device refers to a component within the home appliance that performs wireless network searching and connection to the searched wireless network. According to embodiments of the present disclosure, the home appliance connection device may be interpreted as the home appliance, or may be a component controlled by a user of the home appliance or a processor in the home appliance.

As shown in FIG. 2, the home appliance connection device according to embodiments of the present disclosure may search for a wireless access point. Hereinafter, since the home appliance is contained in the coverage of the B wireless access point 130, the home appliance connection device may detect the B wireless access point 130 as a connectable wireless access point and transmit the searching result to the terminal device. The terminal device provides connectable wireless access point information to the user for registration of the home appliance. The wireless access point information as provided corresponds not to the A wireless access point but to the B wireless access point Thus, the home appliance connection device may detect the accurate wireless access point information based on the actual environment of the home appliance and may provide information about the accurate wireless access point to the user.

Specifically, the home appliance connection device according to embodiments of the present disclosure includes a wireless LAN device. The home appliance may search for a wireless access point using the wireless LAN device and may transmit the searching result to the terminal device. The wireless LAN device supports two modes. A first mode is a station mode, and a second mode is an AP mode (Access Point mode). A mode in which the wireless LAN device may simultaneously support the station mode and the AP mode may be referred to as a concurrent mode. The home appliance connection device according to embodiments of the present disclosure may support the station mode and the AP mode at the same time, or may not support the station mode and AP mode at the same time. A connection method of the home appliance to the wireless network based on each mode will be described later.

Referring to FIG. 2, the home appliance connection device according to embodiments of the present disclosure supports the concurrent mode. Since in the concurrent mode, both the station mode and AP mode may be available at the same time, the home appliance connection device according to embodiments of the present disclosure transmits a wireless LAN signal to the terminal device using the AP mode under the concurrent mode. The terminal device which has received the wireless LAN signal is connected to the home appliance connection device. Then, the terminal device requests a wireless access point (AP) search toward the connected home appliance connection device thereto. The home appliance connection device that has received the AP search request searches for a wireless access point around the home appliance using the station mode under the concurrent mode. When the wireless access point search is completed, the home appliance connection device transmits the wireless access point searching result to the terminal device. The terminal device displays wireless access point connection information on the display thereto which may be provided to the user. The wireless access point connection information according to embodiments of the present disclosure may include a name of a wireless access point and a signal strength thereof. Since the wireless access point to that the home appliance connection device may connect is the B wireless access point 130, the wireless access point searching result received by the terminal device corresponds to the B AP. The user of the terminal device may select the B wireless access point so that the home appliance may be connected to the second wireless access point. The terminal device transmits wireless access point connection information (AP connection information) allowing the home appliance to be connected to the B wireless access point to the home appliance connection device. The AP connection information supplied from the terminal device to the home appliance connection device corresponds to connection information that may allow the home appliance to be connected to the second wireless access point. Thus, the home appliance connection device may avoid receiving inaccurate wireless access point information from the terminal device, and the home appliance connection device may be accurately connected to the B wireless access point without failure.

Further, the home appliance connection device accesses the wireless access point via a following process using the AP connection information received from the terminal device, and completes registration of the home appliance into a server connected to the wireless access point. In this connection, the AP connection information includes information such as SSID (Service Set Identifier) and a channel about each wireless access point.

The home appliance connection device according to embodiments of the present disclosure uses the station mode under the concurrent mode to connect the B wireless access point based on the AP information. As described above, the AP information received from the terminal device by the home appliance connection device is connection information about the second wireless access point. Thus, the home appliance may be connected to the B wireless access point without failure, and the registration of the home appliance onto the server may be completed. In this connection, since the concurrent mode is supported, the home appliance connection device may use the AP mode and the station mode simultaneously. The home appliance connection device may transmit information to the terminal device and receive information from the terminal device while continuously communicating with the terminal device using the AP mode under the concurrent mode. Accordingly, the home appliance connection device may transmit, to the terminal device, information on a AP connection progress status, a server connection status for the registration of the home appliance onto the server, and/or a home appliance registration process. The user of the terminal device which has received the information from the home appliance connection device may monitor the registration process of the home appliance.

In one example, in the above-described registration process of the home appliance, the terminal device requests wireless access point search toward the home appliance connection device. Upon receiving the request, the home appliance connection device searches for a wireless access point, and the home appliance connection device transmits the searching result to the terminal device. It takes a certain time duration for the user of the terminal device to identify wireless access point information. For example, the terminal device generates a wireless access point searching request message, and transmits the generated wireless access point searching request message to the home appliance connection device. Then, the home appliance connection device searches for a wireless access point, generates a wireless access point searching list or message, and transmits the same to the terminal device. The list or message received by the terminal device is displayed on the display of the terminal device to provide necessary information to the user. Assuming that a time duration for which a series of the above operations is performed is 300 ms, and that it takes 200 ms for the home appliance connection device to perform wireless access point search on a single RF channel, a total duration of the above process for a home appliance connection device supporting Korea based 2.4 GHz consisting of a total of 13 channels may be 2.9 seconds (300 ms+200 ms*13). Further, when the home appliance connection device supports both Korea based 2.4 GHz and 5 GHz, a total duration for which the home appliance connection device receives the AP searching request, searches for a wireless access point, and transmit the searching result to the terminal device may be 8.1 seconds (300 ms+200 ms*13(2.4 GHz)+200mx*26(5 GHz). Therefore, as the total duration of the above process increases, the user of the terminal device must further wait to select the wireless access point of the home appliance connection device. Hereinafter, a connection method of the home appliance to the wireless network according to embodiments of the present disclosure that may further shorten the total duration of the above process will be described.

Figure 3:
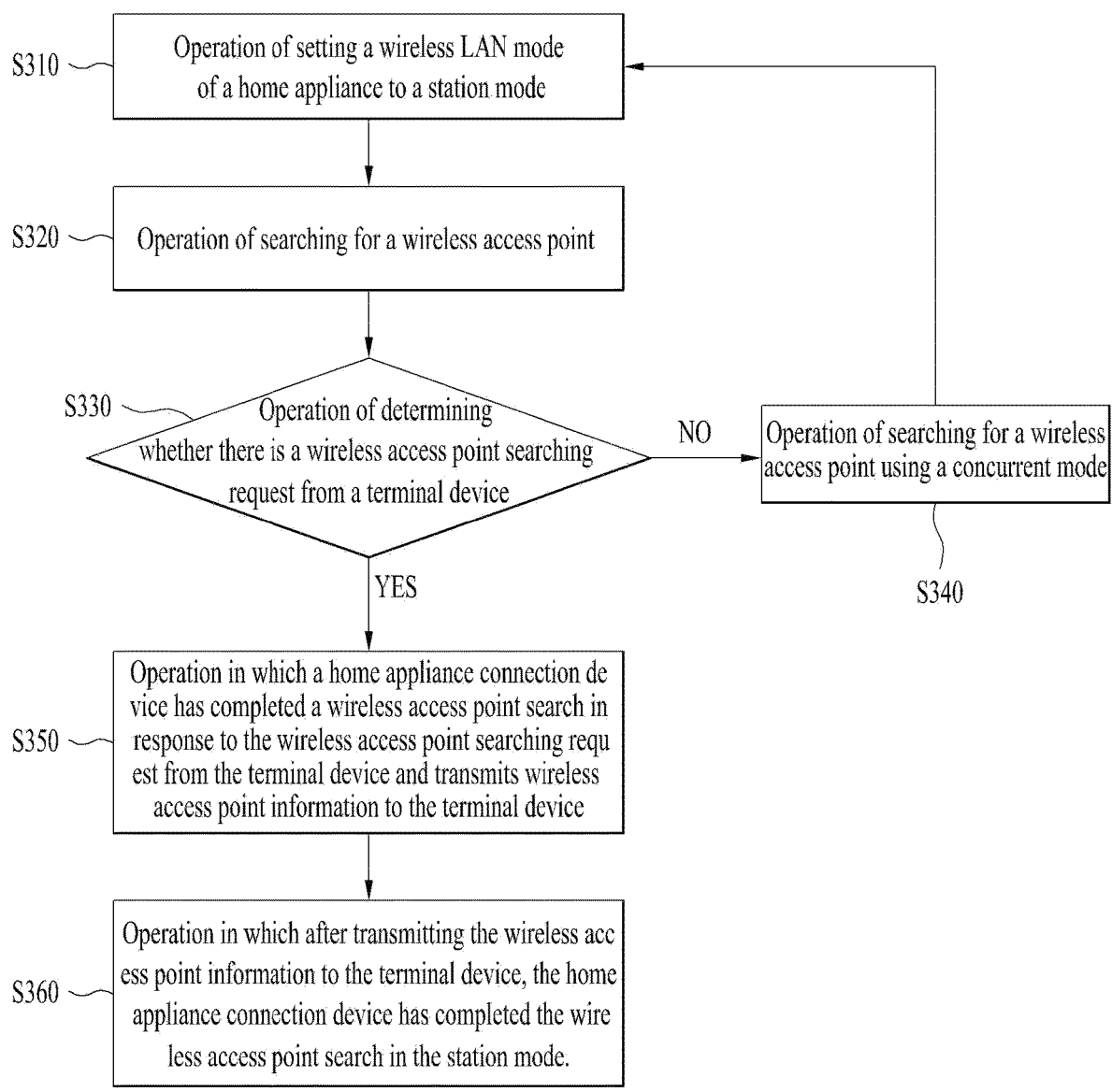
FIG. 3 shows a method in which a home appliance connection device periodically searches for a wireless access point around a home appliance, and stores and delivers the search result.

FIG. 3 shows a method in which the home appliance connection device periodically searches for a wireless access point around the home appliance, and stores and delivers the search result.

The home appliance connection device according to embodiments of the present disclosure uses a following method in order to effectively reduce a time duration required for the home appliance to search for the wireless access point. As used herein, the wireless access point may be used in an exchangeable manner with the wireless network.

Specifically, the home appliance connection device according to embodiments of the present disclosure may periodically search for a wireless access point, store the searching result, and transmit the stored searching result to the terminal device.

The home appliance connection device according to embodiments of the present disclosure may include a controller, a receiver, and/or a transmitter. The controller controls an operation related to communication of the home appliance connection device via a wireless LAN thereof. The controller may set a mode of the wireless LAN device of the home appliance connection device to the AP mode, the station mode, the concurrent mode, etc. The controller in the home appliance connection device may correspond to the wireless LAN device. Herein, an operation in which the home appliance connection device controls the mode of the wireless LAN may be executed by the controller of the home appliance connection device. The receiver receives information transmitted from the terminal device. To connect the terminal device and the home appliance with each other, the terminal device transmits a wireless network searching request to the home appliance connection device. The wireless network searching request transmitted from the terminal device is received by the receiver in the connection device of the home appliance. Further, the receiver may receive information transmitted via the wireless network in a process in which the home appliance communicates with the serve over the wireless network. Herein, a process in which the home appliance connection device receives information in a communication process between the home appliance connection device and the terminal device and/or the wireless network may be executed by the receiver of the home appliance connection device. After the home appliance connection device has searched for the wireless network, the transmitter transmits information about the searched wireless network or stored information about the searched wireless network to the terminal device. Further, the transmitter may transmit, over the connected wireless network, information necessary in a process of registering the home appliance onto the server via the connected wireless network. In the present specification, an operation in which the home appliance connection device transmits information in a communication process between the home appliance connection device and the terminal device and/or the wireless network may be executed by the transmitter of the home appliance connection device.

Referring to FIG. 3, the home appliance connection method according to embodiments of the present disclosure includes operation S310 of setting the wireless LAN mode of the home appliance connection device to the station mode, operation S320 of searching for a wireless access point, operation S330 of determining whether there is a wireless access point searching request from the terminal device, operation S340 of searching for a wireless access point using the concurrent mode, operation S350 in which the home appliance connection device has completed the wireless access point search in response to the wireless access point searching request from the terminal device and transmits wireless access point information to the terminal device, and/or operation S360 in which after transmitting the wireless access point information to the terminal device, the home appliance connection device has completed wireless access point search in the station mode.

In operation S310, the home appliance connection device according to embodiments of the present disclosure may set a state for wireless access point search using the station mode as the mode of the wireless LAN device in the home appliance connection device.

In operation S320, the home appliance connection device according to embodiments of the present disclosure searches for a wireless access point around the home appliance in the station mode separately from the AP mode according to a searching period. The home appliance connection device stores wireless access point information as the searching result in the home appliance connection device. The home appliance connection device may set the searching period. A searching period setting method will be described later.

In operation S330, the home appliance connection device according to embodiments of the present disclosure may receive a wireless access point searching request from the terminal device. The home appliance connection device performs operation S350 when there is a wireless access point searching request from the terminal device, and performs operation S340 when there is no wireless access point searching request from the terminal device.

In operation S340, the home appliance connection device according to embodiments of the present disclosure searches for a wireless access point using the concurrent mode, and periodically searches for a wireless access point using the station mode under the concurrent mode.

In operation S350, the home appliance connection device according to embodiments of the present disclosure receives a wireless access point searching request from the terminal device. In response to the receipt of the wireless access point searching request from the terminal device, the home appliance connection device transmits wireless access point information as the searching result to the terminal device. A time point when the home appliance connection device receives the wireless access point searching request from the terminal device is within the searching period of the wireless access point by the home appliance connection device, and thus the home appliance connection device is searching for the wireless access point. In this case, the home appliance connection device completes the operation of searching for the wireless access point and transmits the wireless access point information to the terminal device. To the contrary, the home appliance connection device does not perform wireless access point search because the time point when the home appliance connection device receives the wireless access point searching request from the terminal device is beyond the searching period of the wireless access point by the home appliance connection device. In this case, the home appliance connection device transmits the most recent wireless access point information stored in a previous searching period to the terminal device.

In operation S360, when the home appliance connection device according to embodiments of the present disclosure has transmitted the wireless access point information to the terminal device, and then an entirety of the searching period of the wireless access point by the home appliance connection device has not elapsed, the home appliance connection device searches for a wireless access point according to the station mode for a remaining time duration within the searching period.

Specifically, when the home appliance is powered on, the wireless LAN device of the home appliance connection device is turned on, or the mode of the wireless LAN device of the home appliance connection device is set or changed to the concurrent mode, the home appliance connection device according to embodiments of the present disclosure searches for the wireless access point around the home appliance periodically. The home appliance connection device stores the wireless access point information as a result of the periodic search inside the home appliance. In other words, the home appliance connection device searches for a surrounding wireless access point every predetermined period in a separate manner from an AP mode operation. Accordingly, the home appliance connection device always stores therein recently searched wireless access point information.

The home appliance connection device according to embodiments of the present disclosure periodically searches for a wireless access point and stores therein the searched wireless access point. Thus, when the terminal device requests wireless access point search toward the home appliance connection device, the home appliance connection device may transmit the most recent wireless access point information as searched and stored previously to the terminal device.

The home appliance connection device according to embodiments of the present disclosure may set a period at which the home appliance connection device searches for a wireless access point. Criteria for setting the searching period may be determined according to a type of the home appliance. When the searching period is short, power consumption of the home appliance increases due to more frequent wireless access point searching operations of the home appliance. When the searching period is long, reliability of wireless access point information searched by and stored in the home appliance when the terminal device requests the wireless access point search may be low. For optimal searching period setting, the searching period may be set according to the type of the home appliance. For example, home appliances such as refrigerators, washing machines, or air conditioners are less sensitive to power consumption, and is not easily displaced. Accordingly, the home appliance connection device thereof may have a longer wireless access point searching period. To the contrary, home appliances such as robot cleaners and air cleaners may be relatively easily displaced. Therefore, the home appliance connection device thereof may have a shorter wireless access point searching period.

The home appliance connection device according to embodiments of the present disclosure may variously change a searching period value. Specifically, when the home appliance connection device searches for the wireless access point according to an initially set searching period, and then the searching results are the same for a certain number of times of the searching, the home appliance connection device may increase the searching period value to reduce the number of times of searching. When the searching period value reaches a maximum value, the home appliance connection device no longer increases the searching period value. When a current searching result is different from a previous searching result, the home appliance connection device may reduce the searching period value. In this connection, the home appliance connection device may not reduce the searching period value to be smaller than the initially set searching period value.

Further, while the home appliance connection device according to embodiments of the present disclosure initially searches for a wireless access point adjacent to the home appliance in the station mode, the home appliance connection device may receive a wireless access point searching request from the terminal device. When the home appliance connection device has received the wireless access point searching request from the terminal device, the home appliance connection device may stop the currently-performed search and transmit previous searched and stored searching result to the terminal device. After the home appliance connection device has transmitted a wireless access point searching information list to the terminal device, the home appliance connection device completes the wireless access point search in the station mode and continues a registration process. When the home appliance connection device is not connected to the wireless access point during the registration process of the home appliance, the home appliance connection device may repeat the process as described in FIG. 3 to search for the wireless access point again.

In one example, the concurrent mode in which the wireless LAN mode of the home appliance connection device may use the station mode and the AP mode simultaneously may be supported. Thus, when the home appliance has two RFs (radio frequency), the home appliance connection device according to embodiments of the present disclosure may easily perform the above-described connection operation. However, the home appliance connection device according to embodiments of the present disclosure may have a single RF. Thus, the home appliance may have limitation in performing the searching operation and the connection waiting operation in the AP mode using a single RF. A method for effectively reducing a time duration for which the home appliance connection device searches for the wireless access point and furthermore efficiently searching for the wireless access point even when the home appliance has a single RF will be described later.

The above-described method of FIG. 3 may be applied without restriction when the wireless LAN device of the home appliance connection device includes two RFs to support the concurrent mode. This is because the station mode and the AP mode of the home appliance connection device may be independently executed simultaneously using the two RFs, respectively. In one example, when the home appliance includes a single RF, the home appliance connection device may have restriction in performing the searching and/or connection waiting process in the AP mode.

When the home appliance connection device according to embodiments of the present disclosure includes a wireless LAN device including a single RF, the home appliance connection device may use the station mode to start searching for a surrounding wireless access point while waiting for the AP mode. In this case, the home appliance connection device may continuously occupy a single RF resource in the station mode in order to search for all channels. When the single RF resource is allocated only to the station mode, a problem may occur when the home appliance connection device waits for connection via the AP mode. The home appliance connection device may search for a wireless access point via the station mode of the single RF, and search for only a single channel, and then allocate the single RF to the AP mode for a predetermined time duration. After a certain duration has elapsed, the home appliance connection device may search for a remaining channel by allocating the station mode to the RF resource again. In other words, the home appliance connection device periodically searches for a channel using the single RF resource in the station mode. When at least one channel has been detected, the home appliance connection device may wait for AP connection using the single RF resource in the AP mode. Although the device may not search for all channels at once according to the periodic search of the channel, the periodic search of the channel is not an important factor considered in shortening the searching time duration. Because the home appliance connection device waits in the AP mode for a certain time duration between timings when the home appliance connection device searches for the channel in the station mode, the home appliance connection device may wait for the connection in the AP mode and search for the channel in the station mode, using a single RF. Assuming that a duration for which the device searches for the channel in the station mode is 200 ms and a time duration between channel searching timings in the station mode is 200 ms, a time it takes for the device to complete the searching of a 2.4 GHz wireless access point may be 200 ms*13+200 ms*12=5 s. 5 s time required for the periodic search in the station mode may not be problematic when the home appliance connection device searches for the wireless access point in the station mode.

Figure 4:
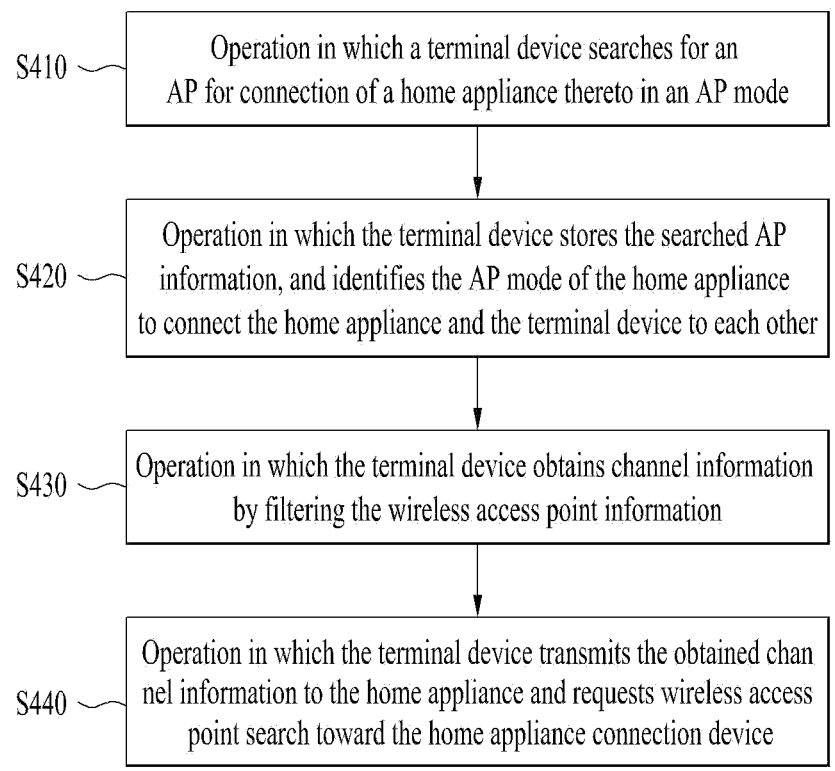
FIG. 4 shows a method in which a terminal device transmits RF channel information necessary for home appliance search to a home appliance connection device.

FIG. 4 shows a method in which the terminal device transmits RF channel information required for the home appliance connection device to search for the channel to the home appliance connection device.

The terminal device associated with the home appliance connection device according to embodiments of the present disclosure may transmit RF channel information obtained by filtering the wireless access point information to the home appliance connection device in order to shorten a duration for which the home appliance connection device searches for the wireless access point. The terminal device according to embodiments of the present disclosure may perform operation S410 in which the terminal device searches for an AP for connection of the home appliance connection device thereto in the AP mode, operation S420 in which the terminal device stores the searched AP information, and identifies the AP mode of the home appliance connection device to connect the home appliance and the terminal device to each other, operation S430 in which the terminal device obtains channel information by filtering the wireless access point information, and/or operation S440 in which the terminal device transmits the obtained channel information to the home appliance connection device and requests a wireless access point search toward the home appliance connection device.

In operation S410, since the home appliance connection device according to embodiments of the present disclosure includes a wireless LAN device supporting the concurrent mode, the home appliance connection device may wait for connecting to the terminal device in the AP mode of the home appliance connection device. The home appliance connection device and the terminal device may be connected to each other using the AP mode of the home appliance connection device. The terminal device according to embodiments of the present disclosure may search for the AP in order to be connected to the home appliance connection device. In one example, the station mode of the home appliance connection device may be deactivated until the terminal device and the home appliance connection device are connected to each other.

In operation S420, the terminal device associated with the home appliance connection device according to embodiments of the present disclosure identifies the AP mode of the home appliance connection device from a list of the searched APs (wireless access points) and the home appliance connection device and the terminal device may be connected to each other in the AP mode. Further, the terminal device stores the searched AP list in the terminal device.

In operation S430, the terminal device associated with the home appliance connection device according to embodiments of the present disclosure may be connected to the home appliance connection device, and the AP list stored in the terminal device may be filtered to obtain channel information to be searched for by the home appliance connection device. Specifically, the terminal device may filter and delete an EAP-Enterprise supporting AP and a P2P AP from the stored AP list or wireless access point information, and the terminal device may acquire only AP information supporting only EAP-Personal. This is because, for the registration of the home appliance connection device, the AP used in a place where the home appliance connection device is located usually only supports the EAP-Personal. That is, the terminal device first filters and deletes the APs not related to the home appliance connection device from the AP list, thereby reducing a time duration for which the home appliance connection device searches for the wireless access point. Because the terminal device according to embodiments of the present disclosure transmits the channel information obtained by filtering the AP list to the home appliance connection device, and the home appliance connection device that has received the filtered channel information searches for only a channel included in the channel information, a time duration for which the home appliance connection device searches for the wireless access point may be reduced. Further, the home appliance connection device may search for a wireless access point based on the filtered channel information, and may transmit the searching result to the terminal device, so that the user may receive the filtered result information.

In operation S440, the terminal device associated with the home appliance connection device according to embodiments of the present disclosure transmits a wireless access point searching request message including channel information to the home appliance connection device.

Figure 5:
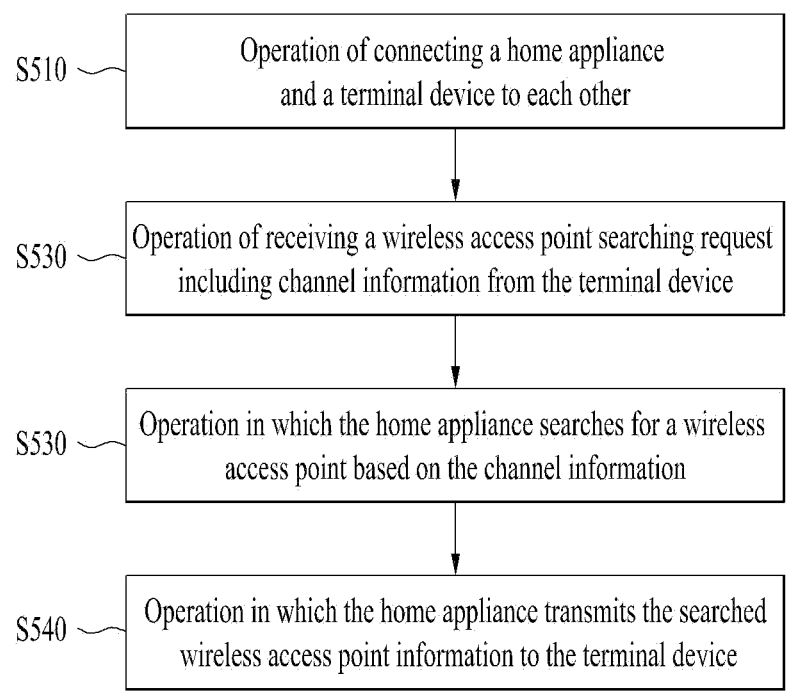
FIG. 5 shows a method in which a home appliance connection device searches for a wireless access point based on a RF channel information received from the terminal device.

FIG. 5 shows a method in which a home appliance connection device searches for a wireless access point based on RF channel information received from the terminal device.

A home appliance connection method according to embodiments of the present disclosure may include operation S510 of connecting the home appliance connection device and the terminal device to each other, operation S520 of receiving a wireless access point searching request including channel information from the terminal device, operation S530 in which the home appliance connection device searches for a wireless access point based on the channel information, and/or operation S540 in which the home appliance connection device transmits the searched wireless access point information to the terminal device.

In the above-described operation, the home appliance connection device is connected to the terminal device S510. The home appliance connection device receives a wireless access point searching request including channel information to be used for searching for a wireless access point from the terminal device S520. The home appliance connection device may obtain a channel list to be searched for based on the received channel information. The home appliance connection device may search for only wireless access points corresponding to the channel list S530. The home appliance connection device transmits wireless access point information as the searching result to the terminal device S540.

In one example, in order for the home appliance connection device to receive the channel information from the terminal device, the connection thereof with the terminal device must be maintained. The home appliance according to embodiments of the present disclosure may include two or more RFs, and may include a single RF. When the home appliance includes at least two RFs, the connection thereof to the terminal device may be continuously maintained in the AP mode under the concurrent mode. In order that the home appliance including a single RF continuously maintains the connection with the terminal device, the home appliance connection device may periodically transmit a beacon message to the terminal device. A transmitter of the home appliance connection device may transmit the beacon message to the terminal device.

In other words, the home appliance connection device having a single RF transmits the beacon message to the terminal device connected thereto in the AP mode under the concurrent mode so that the connection between the terminal device and the home appliance connection device is not disabled. In this connection, the home appliance connection device periodically transmits the beacon message to the terminal device while performing the wireless access point search based on the channel information received from the terminal device.

In the above-described method, the home appliance connection device according to embodiments of the present disclosure may provide the wireless access point information as the searching result to the user of the terminal device, and may provide a signal strength of the searched wireless access point to the user of the terminal device. Further, when there is a wireless access point in a coverage of a channel that the terminal device could not search for, there may be a case where the home appliance connection device cannot search for a wireless access point that is out of a coverage of the terminal device. In this connection, the method in which the home appliance connection device searches for a wireless access point that the terminal device could not search for is described above. Thus, according to an embodiment of the present disclosure, each of the wireless access points may be efficiently searched for and the searching result may be provided to the terminal device. In particular, when the home appliance connection device having a single RF uses the concurrent mode, the embodiment shown in FIG. 5 may be more effective.

In the above-described method in which the home appliance connection device periodically searches for a wireless access point and transmits a searching result to the terminal device, when the terminal device requests searching of a surrounding wireless access point toward the home appliance connection device, the home appliance connection device may respond directly to the request from the terminal device and transmit the searching result to the terminal device. In the above-described method in which the home appliance connection device searches for a wireless access point based on RF channel information received from the terminal device, the home appliance connection device has received the wireless access point searching request from the terminal device, and then the home appliance connection device searches for the access point, based on the filtered wireless access point information. The time durations required for searching for the AP in the two methods may be different from each other.

Figure 6:
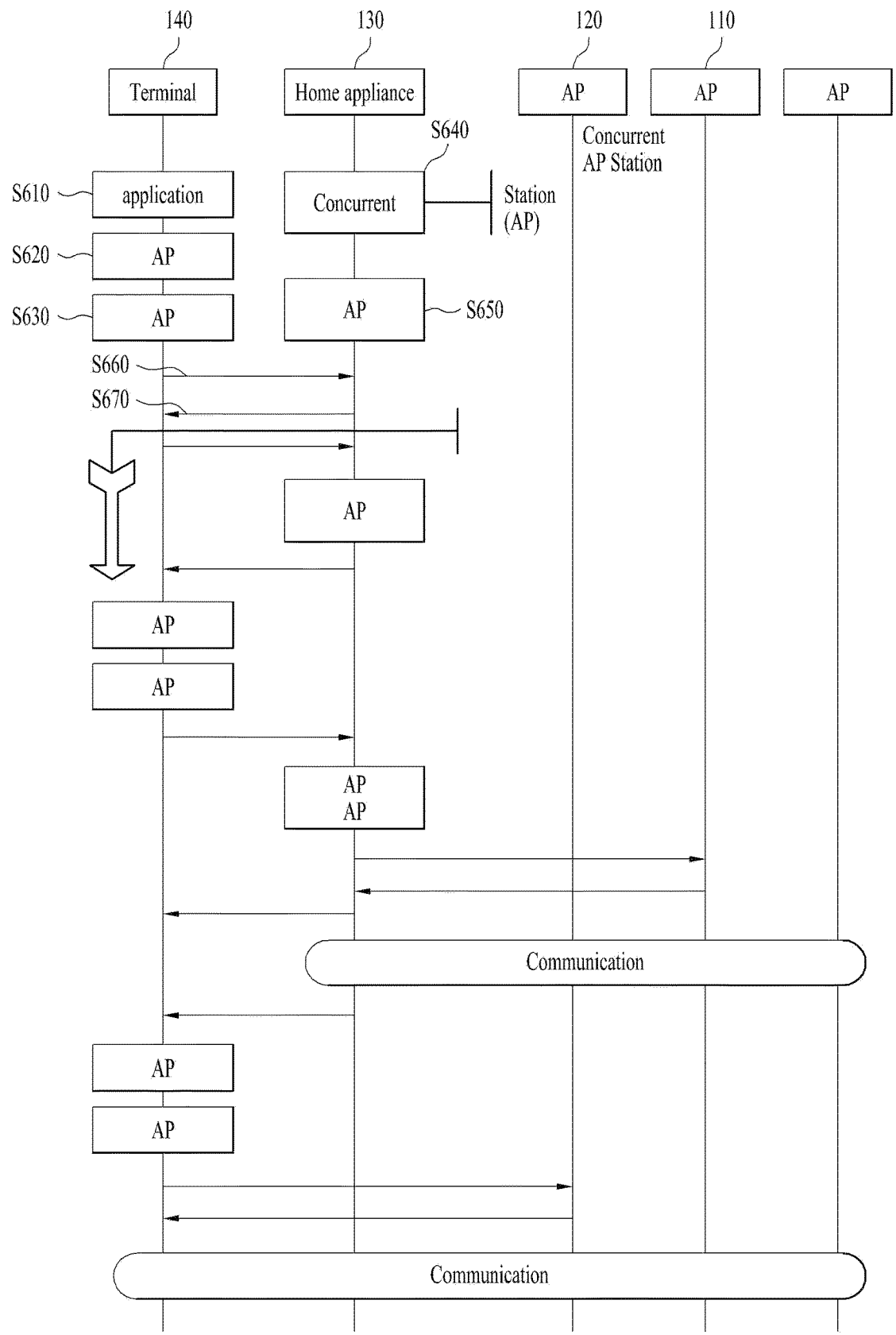
FIG. 6 shows a method in which a home appliance connection device periodically searches for a wireless access point around a home appliance and transmits the searching result to a terminal device.

FIG. 6 shows a method in which a home appliance connection device periodically searches for wireless access points around the home appliance and transmits the searching result to the terminal device.

The home appliance connection method according to embodiments of the present disclosure may include an operation in which the home appliance connection device periodically searches for a surrounding wireless access point, and an operation of storing information about periodically searched wireless access points and then transmitting the same to the terminal device, and an operation of transmitting, by the terminal device, the filtered channel information to the home appliance connection device such that the home appliance connection device delivers a wireless access point to the terminal device, based on the channel information. The method shown in FIG. 6 specifically describes operations described above in FIG. 3.

In particular, FIG. 6 shows a method in which a home appliance connection device according to embodiments of the present disclosure periodically searches for a surrounding wireless access point and stores the searching result in the terminal device. A user may allow the terminal device or a smart terminal device 140 to execute an app or an application therein S610. In order that the home appliance connection device performs wireless access point searching, a mode of the terminal device is selected as AP mode by the user S620. The terminal device switches the mode of the terminal device to the AP mode such that the home appliance connection device S630 performs the wireless access point search.

In one example, the home appliance connection device 130 according to embodiments of the present disclosure searches for a wireless access point around the home appliance connection device using the station mode under the concurrent mode of the home appliance connection device S640. In this connection, the home appliance connection device periodically performs the wireless access point searching operation S640. Further, the home appliance connection device waits for connection with the terminal device using the AP mode under the concurrent mode S650. Since the home appliance connection device according to embodiments of the present disclosure may support the station mode and the AP mode under the concurrent mode, the home appliance connection device may wait for connection with the terminal device in the AP mode while performing the periodic wireless access point searching operation in the station mode. The terminal device transmits an AP search request to the home appliance connection device using the AP mode S660. In response to the AP searching request from the terminal device, the home appliance connection device periodically searches for a wireless access point and stores therein surrounding wireless access point information or list as searched for and then transmits the same to the terminal device S670.

Assuming that it takes about 300 ms for the above-described process to be performed between the home appliance connection device and the terminal device, the home appliance connection device according to embodiments of the present disclosure may further reduce the required time via the periodic wireless access point searching and delivery method.

The home appliance connection device according to embodiments of the present disclosure may transmit the wireless access point information to the terminal device. The terminal device which has received the wireless access point information may maintain the connection with the home appliance connection device using the AP mode. In addition to the periodic wireless access point searching by the home appliance connection device in the AP connection mode between the terminal device and the home appliance connection device, the terminal device may separately transmit a wireless access point searching request to the home appliance connection device in the AP mode. The home appliance connection device which has received the wireless access point searching request may search for a wireless access point using the above-described method and transmit the searching result to the terminal device. The user of the terminal device may receive information about the A wireless access point or the B wireless access point in the above-described embodiment, based on the wireless access point searching result from the home appliance connection device.

Figure 7:
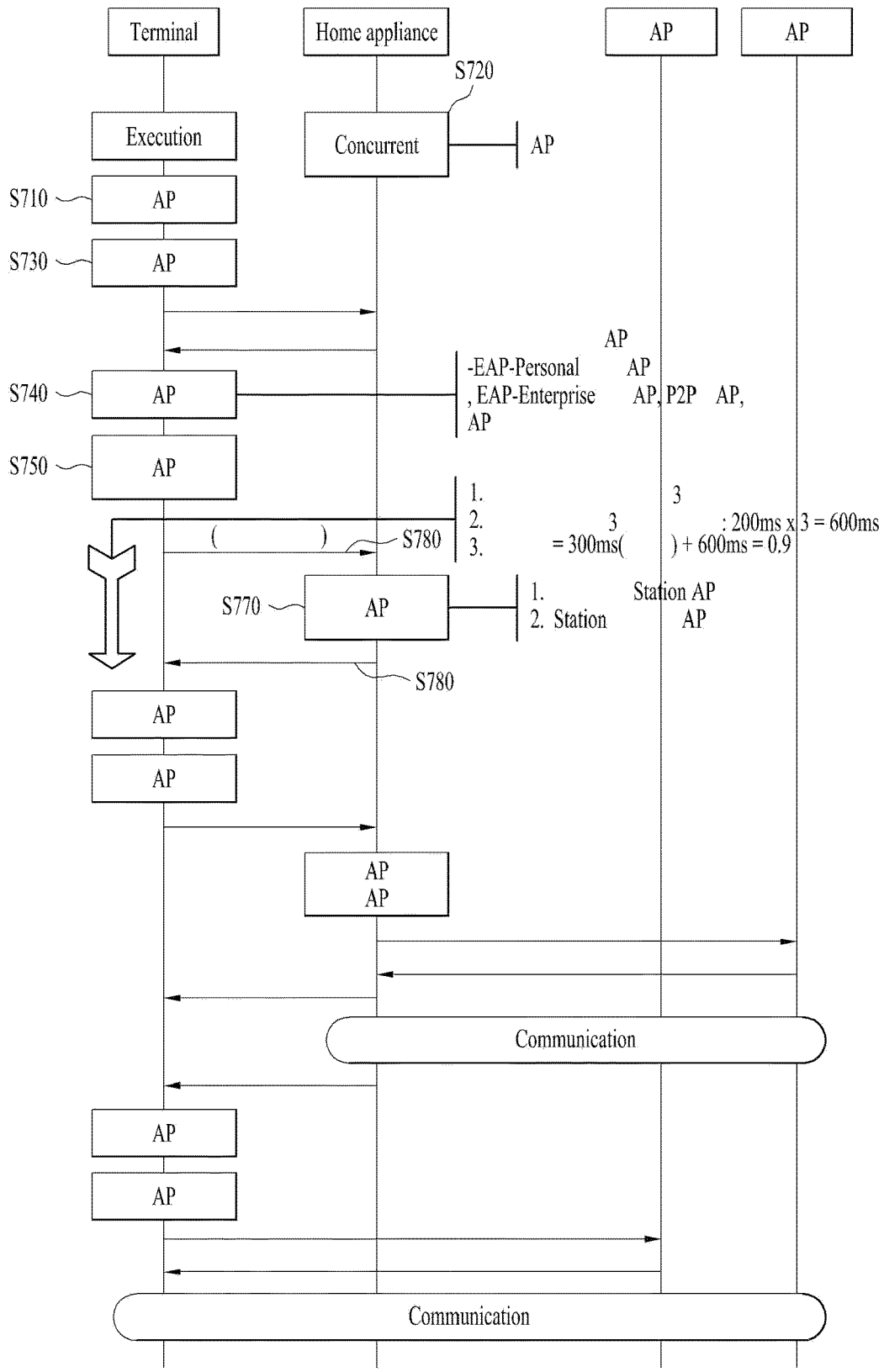
FIG. 7 shows a wireless access point searching method preformed by a home appliance connection device based on RF channel information received from a terminal device.

FIG. 7 shows a wireless access point searching method by a home appliance connection device based on RF channel information received from the terminal device. FIG. 7 specifically describes the operations as described above in FIG. 4.

The terminal device associated with the home appliance connection device according to embodiments of the present disclosure searches for a wireless access point by executing an application S710. The home appliance connection device according to embodiments of the present disclosure may include a wireless LAN device supporting a concurrent mode. The home appliance connection device may activate only the concurrent mode or the AP mode S720 such that the terminal device and the home appliance connection device may be connected to each other.

The terminal device associated with the home appliance connection device according to embodiments of the present disclosure searches for a home appliance connection device and a wireless access point surrounding the terminal device. The searched wireless access point information is stored in the terminal device S730.

The terminal device associated with the home appliance connection device according to embodiments of the present disclosure may acquire information about or a list of surrounding home appliances and surrounding wireless access points APs based on the searched wireless access point (AP) information. The terminal device searches for an AP of a home appliance that needs to be registered in the list, and connects to the home appliance that needs to be registered S740. After the terminal device and the home appliance are connected to each other, the terminal device according to embodiments of the present disclosure filters the searched and stored wireless access point list. That is, in order for the terminal device to generate a channel information list necessary for the home appliance connection device according to the present disclosure to search for a wireless access point, the terminal device filters the wireless access point list. This is intended such that in order to shorten the time duration required for the home appliance connection device according to embodiments of the present disclosure to search for the wireless access point and improve the searching accuracy, the terminal device according to embodiments of the present disclosure searches for a wireless access point and transmits a wireless access point list to the home appliance connection device. In this connection, in order to reduce unnecessary channel information in the process in which the home appliance connection device searches for a wireless access point, the terminal device filters the wireless access point list.

Specifically, the terminal device associated with the home appliance connection device according to embodiments of the present disclosure extracts a wireless access point that supports only EAP-Personal from the wireless access point list. This is because for the registration of the home appliance, the AP used in the place where the home appliance is located usually only supports the EAP-Personal. According to an embodiment, the terminal device may extract an AP that may be used in a place where the home appliance is located. Further, the terminal device removes an AP corresponding to the home appliance from the wireless access point list. This is because a wireless access point of the home appliance is not the searching target. As such, the terminal device creates a wireless access point list to obtain a channel list to be used by the home appliance connection device to search for a wireless access point. APs that may be included in the wireless AP list generated via the filtering may be APs other than APs supporting EAP-Enterprise, APs for P2P, and the AP of the home appliance.

The terminal device associated with the home appliance connection device according to embodiments of the present disclosure extracts channel list information included in the filtered wireless access point list S750. The terminal device transmits an AP searching request including the extracted channel list to the home appliance connection device S760.

The home appliance connection device according to embodiments of the present disclosure receives the wireless access point searching request from the terminal device and then searches for a wireless access point around the home appliance using the channel list information received from the terminal device S770. In order for the home appliance connection device to search for a wireless access point, the wireless LAN mode of the wireless LAN device in the home appliance connection device must be activated as the station mode. The home appliance connection device changes the wireless LAN mode to the station mode when the wireless LAN mode of the home appliance is not the station mode. The home appliance connection device searches only for a wireless access point corresponding to a channel included in the received channel list information.

In this connection, while the home appliance connection device searches for a wireless access point using the station mode, the home appliance connection device is connected to the terminal device under the AP mode. The home appliance connection device may periodically transmit a beacon message to the terminal device using the AP mode so that the connection thereof with the terminal device is not disabled. According to an embodiment of the present disclosure, when the wireless LAN device of the home appliance connection device includes two RFs, the home appliance connection device may simultaneously support the station mode and the AP mode. This is because the home appliance connection device may allocate the two RFs to the station mode and the AP mode, respectively. However, when the home appliance connection device according to embodiments of the present disclosure includes a wireless LAN device including a single RF, the home appliance connection device activates the station mode using a single RF and searches for a wireless access point in the station mode. The home appliance connection device shares the single RF and periodically activates the AP mode and transmits the beacon message to the terminal device. Even when using the single RF, the home appliance connection device may also search for a wireless access point using the station mode and AP mode and maintain the connection thereof with the terminal device.

The home appliance connection device according to embodiments of the present disclosure transmits the searched wireless access point information to the terminal device S780. The user of the terminal device may receive the wireless access point searching result from the home appliance connection device via the terminal device. Depending on embodiments, the searched wireless access point information may include a SSID, a channel, a signal strength, etc. of each wireless access point.

Thereafter, the terminal device associated with the home appliance connection device according to embodiments of the present disclosure may transmit a wireless access point searching request to the home appliance connection device in the AP mode. Upon receiving the wireless access point searching request, the home appliance connection device searches for the wireless access point and transmits the searching result to the terminal device. The user of the terminal device may receive information about the A wireless access point or the B wireless access point in the above-described embodiment based on the wireless access point searching result from the home appliance connection device.

In the above operation, it is assumed that the number of channels in the channel list extracted from the wireless access point list filtered by the terminal device based on the wireless access point list searched by the terminal device is 3. This is because only 3 channels are dominantly used in 2.4 GHz. A total duration for which the home appliance connection device receives the wireless access point searching request from the terminal device and provides the searching result to the terminal device, and the user of the terminal device finally acquires the wireless access point information may be 0.9 second (300 ms+200 ms*3). Thus, this approach may have an effect of further shortening the total duration by 2 seconds than the above-described embodiment in which the total duration is 2.9 seconds. When the wireless LAN environment includes not only 2.4 GHz but also 5 GHz, the total duration may be further reduced.

In other words, the home appliance connection device according to embodiments of the present disclosure may have imitations in the concurrent mode according to the RF type within the home appliance. The home appliance connection device includes two RFs, and the wireless LAN device of the home appliance connection device in the concurrent mode may allocate the station mode and the AP mode to the two RFs, respectively. Since the home appliance connection device has two RFs, the home appliance connection device has no limitation in simultaneously supporting the station mode and the AP mode under the concurrent mode. The home appliance connection device may be connected to the terminal device using the AP mode and may transmit and receive data to and from the terminal device under the AP mode. At the same time, the home appliance connection device may search for a wireless access point using the station mode.

When the home appliance connection device according to embodiments of the present disclosure includes a single RF, the wireless LAN device in the home appliance connection device may support the station mode and the AP mode under the concurrent mode while sharing the single RF. In this connection, the home appliance connection device using the concurrent mode may not perform wireless network search using the station mode while waiting for connection thereof with the terminal device in the AP mode. Since the home appliance connection device uses the single RF, the RF must be used to search for a wireless network in the station mode. In this case, the home appliance connection device may not receive a probe request message transmitted from the terminal device in the AP mode. When the terminal device does not receive the probe response message from the home appliance connection device, the terminal device does not attempt to connect to the home appliance connection device.

Further, when the home appliance connection device is connected to the terminal device using the AP mode, in order for the home appliance connection device to switch the AP mode to the station mode and search for a wireless network, the home appliance connection device must periodically acquire RF resources for use in the station mode during the wireless network searching duration in the station mode. In this connection, the home appliance connection device transmits the beacon message to the terminal device using the AP mode as an RF resource. That is, the home appliance connection device may periodically use the station mode and the AP mode while sharing the single RF. When a basic period is 100 ms, the home appliance connection device transmits the beacon message to the terminal device every basic period so that the connection between the home appliance connection device and the terminal device is not disabled. Even when the home appliance connection device transmits the beacon message to the terminal device, it may be difficult for the home appliance connection device to receive data from the terminal device. Accordingly, the home appliance connection device according to the present disclosure as described in FIGS. 3 to 4 may solve these limitations.

Figure 8:
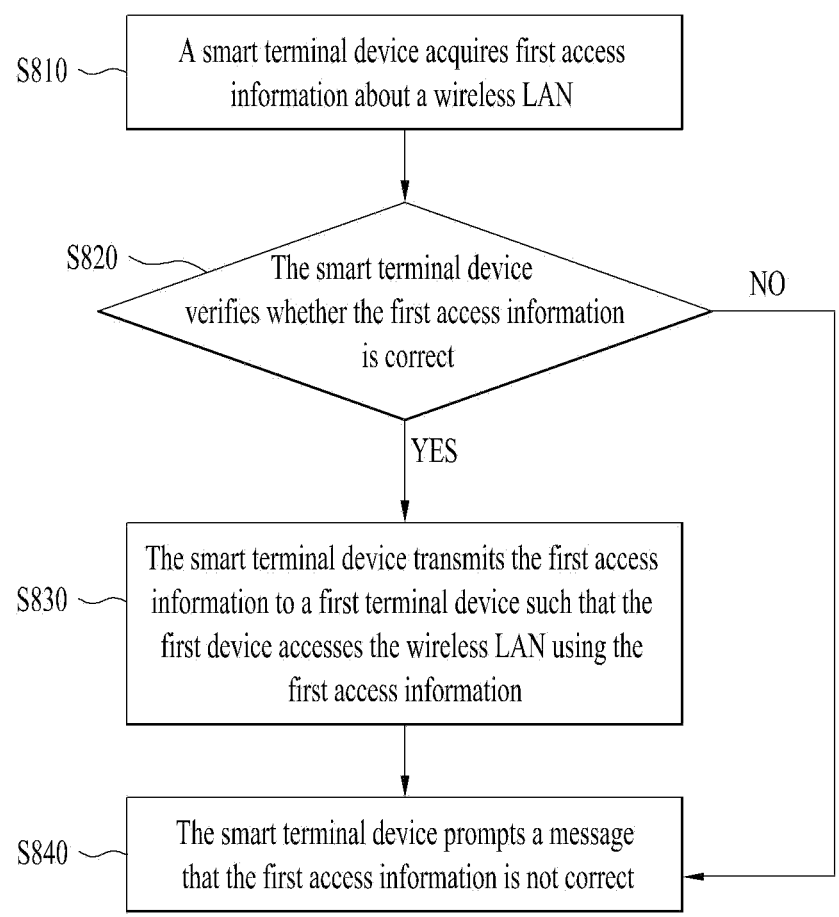
FIG. 8 shows a method in which a terminal device accesses to a wireless LAN (Local Area Network).

FIG. 8 shows a method in which the terminal device connects to the wireless LAN (Local Area Network).

The terminal device associated with the home appliance connection device according to embodiments of the present disclosure may mean a device including a smart terminal device or a terminal device capable of receiving an user input. The terminal device may control another terminal device or another product such that another terminal device or another product may access the wireless LAN.

The terminal device associated with the home appliance connection device according to embodiments of the present disclosure acquires information about a wireless network around the terminal device S810, and verifies the acquired wireless network information S820. The terminal device (first terminal device) transmits wireless access information about the verified wireless network information to another terminal device (second terminal device) requiring wireless access S830. After the first terminal device transmits the wireless access information required for the second terminal device to perform wireless access to the second terminal device, the first terminal device prompts a message that the wireless access information as obtained is not correct because the wireless access information is not information for the first terminal device S840.

The above-described wireless network connection control process as performed by the terminal device is applied to the terminal device and the home appliance connection device as follows. The terminal device according to embodiments of the present disclosure searches for a wireless network and acquires wireless network access information. The terminal device verifies that the acquired wireless network access information is correct. The terminal device transmits an access request to a wireless network corresponding to the acquired wireless network access information. The terminal device receives a response to the access request from the wireless network. The terminal device may determine whether wireless network access information is correct based on the response to the access request. When the wireless network access information is correct, the terminal device transmits the wireless network access information to the home appliance connection device requiring wireless network access. The home appliance connection device according to embodiments of the present disclosure connects the home appliance to the wireless network based on the received wireless network access information. When the wireless network access information is incorrect, the terminal device outputs or displays information indicating that the wireless network access information is incorrect via an user interface of the terminal device. Then, the terminal device searches for a wireless network again.

The home appliance connection device according to embodiments of the present disclosure solves a problem that may occur when the terminal device verifies wireless network access information required to connect the home appliance connection device to the wireless network. Specifically, when there are a plurality of wireless network APs, the home appliance connection device according to embodiments of the present disclosure may avoid searching for a wireless network that complies with a network standard that the home appliance connection device does not support. Alternatively, the home appliance connection device according to embodiments of the present disclosure may search for a wireless network having the largest signal strength at a location of the home appliance at the highest priority. Furthermore, in order for the terminal device according to the present disclosure to deliver wireless access information to a home appliance or a home product requiring wireless network registration thereof, an operation in which the terminal device acquires and verifies necessary access information must precede. A method for shortening a time duration required for the home appliance and/or the terminal device according to embodiments of the present disclosure to establish wireless connection to the wireless network.

Figure 9:
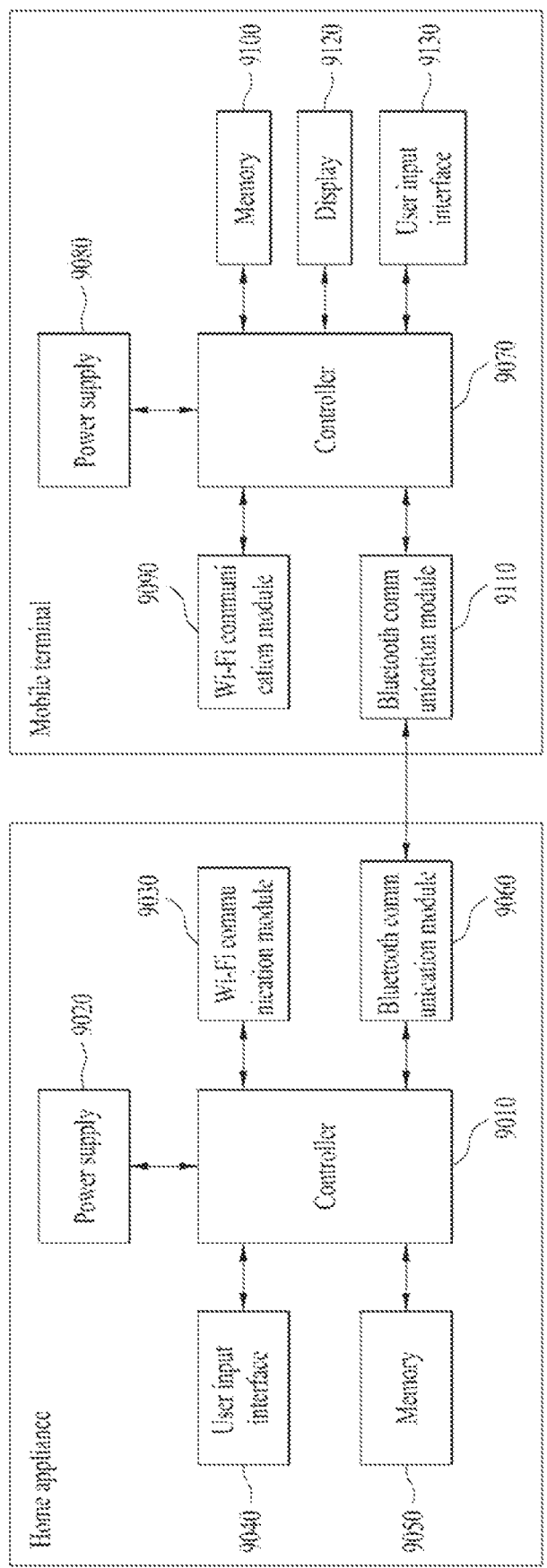
FIG. 9 shows a configuration of each of a home appliance and a terminal device.

FIG. 9 shows a configuration of a home appliance connection device and a terminal device.

The home appliance connection device according to embodiments of the present disclosure may include a controller 9010, a power supply 9020, a first communication module 9030, a user input interface 9040, a memory 9050, and/or a second communication module 9060. Each of the components of the home appliance connection device will be described below.

The power supply receives power from an outside of the home appliance connection device and supplies the power to the home appliance connection device.

The user input interface receives input information for controlling the home appliance connection device via an user input, and transmits the input information to the controller. In a registration process of the home appliance connection device according to embodiments of the present disclosure, it may not be necessary to receive the input information from the user input interface and transmit the same to the controller.

The memory stores information necessary to perform an operation of the home appliance connection device in the memory of the home appliance connection device and manages the information.

The controller preforms network setting of the home appliance connection device, and controls overall operations of the home appliance connection device. The controller according to embodiments of the present disclosure may set a mode of the wireless LAN. The controller may control the first communication module and/or the second communication module to execute the wireless network searching and connection. Further, the controller may control the power supply to power on or off the home appliance or the controller.

The first communication module controls communication between the wireless network (AP) and the home appliance connection device. The first communication module according to embodiments of the present disclosure may be embodied as a Wi-Fi module operating only in a single mode (in a station mode).

The second communication module controls Bluetooth communication of the home appliance connection device. The second communication module according to embodiments of the present disclosure may be embodied as a wireless communication module supporting BR/EDR and BLE mode based on Bluetooth 4.2. The home appliance connection device supports Bluetooth communication using the second communication module, receives information necessary for the registration of the home appliance connection device from the terminal device via the Bluetooth communication, and transmits the information to the terminal device.

The terminal device associated with the home appliance connection device according to embodiments of the present disclosure includes a controller 9070, a power supply 9080, a first communication module 9090, a memory 9100, a second communication module 9110, a display 9120, and/or a user input interface 9130.

The power supply receives power from an outside of the home appliance connection device and supplies the power to the terminal device.

The user input interface receives information for controlling the terminal device via an user input, etc. and transmits the information for controlling the terminal device to the controller of the terminal device.

The memory stores information necessary to perform an operation of the terminal device in the memory of the terminal device and manages the information.

The controller controls overall operations of the terminal device, such as new registration of the home appliance or network setting thereof.

The display transmits user information output via an operation of the terminal device to an UI (User Interface) of the terminal device.

The first communication module controls communication between the terminal device and the wireless network (AP).

The first communication module according to embodiments of the present disclosure may access the terminal device to the AP based on a Wi-Fi standard.

The second communication module controls Bluetooth communication of the terminal device. The second communication module according to embodiments of the present disclosure may be embodied as a wireless communication module supporting BR/EDR and BLE mode based on Bluetooth 4.2. The second communication module exchanges information necessary for the product registration of the home appliance connection device with the home appliance connection device via Bluetooth communication.

In a system including the terminal device associated with the home appliance connection device and the home appliance connection device according to embodiments of the present disclosure, not the terminal device but home appliance connection device may search for the wireless network. That is, the terminal device does not search for the wireless network connected to the home appliance connection device, but the home appliance connection device searches for the wireless network connected thereto. The home appliance connection device to be connected to the wireless network may search for the wireless network, and the searching result of the wireless networks may be provided to the user of the terminal device in a prioritized manner corresponding to a signal strength of a connectable wireless network. Further, before wireless communication between the terminal device and the home appliance connection device for registration of the home appliance or network setting thereof is established, the wireless network search is first performed by the home appliance connection device using a BLE advertisement message from the terminal device. Then, the wireless communication between the terminal device and the home appliance connection device is established and then immediately the searching result is provided to the terminal device. Accordingly, the home appliance connection device and the terminal device according to the present disclosure may further shorten the searching time duration when comparing to an approach in which the terminal device searches for the wireless network and verifies the searched wireless network.

Figure 10:
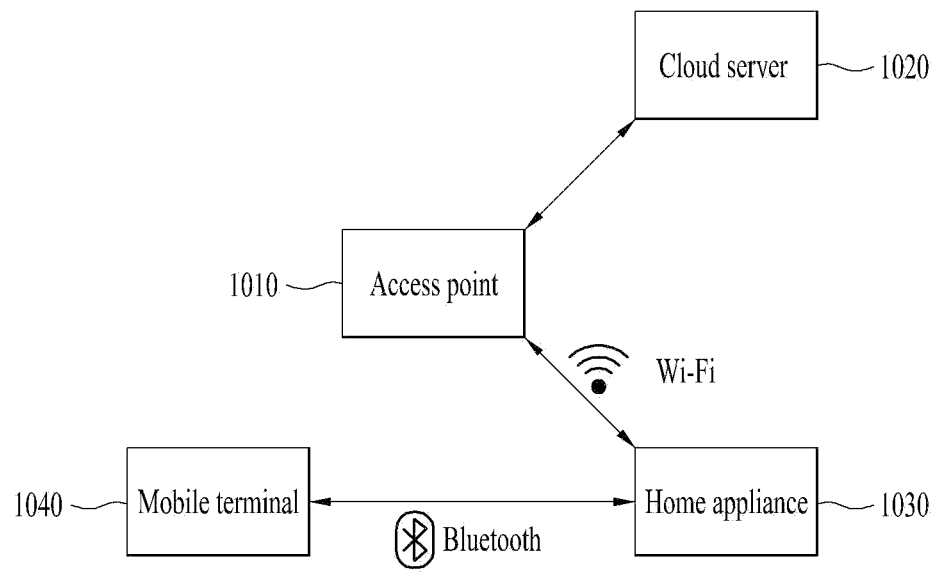
FIG. 10 shows a network setting for wireless network searching and setting required for home appliance registration.

FIG. 10 shows a network setting diagram for wireless network searching and configuration as required for registration of the home appliance connection device.

A network according to embodiments of the present disclosure may include an access point AP (or a wireless network) 1010, a server 1020, the home appliance connection device 1030, and/or the terminal device 1040.

The home appliance connection device and the terminal device according to embodiments of the present disclosure may communicate with each other using BLE. Using the BLE communication, the home appliance connection device and the terminal device exchange a wireless network list and network access information required for a wireless network setting process. The home appliance connection device may be connected to the access point in a Wi-Fi manner based on wireless network setting information received from the terminal device via the BLE communication.

Figure 11:
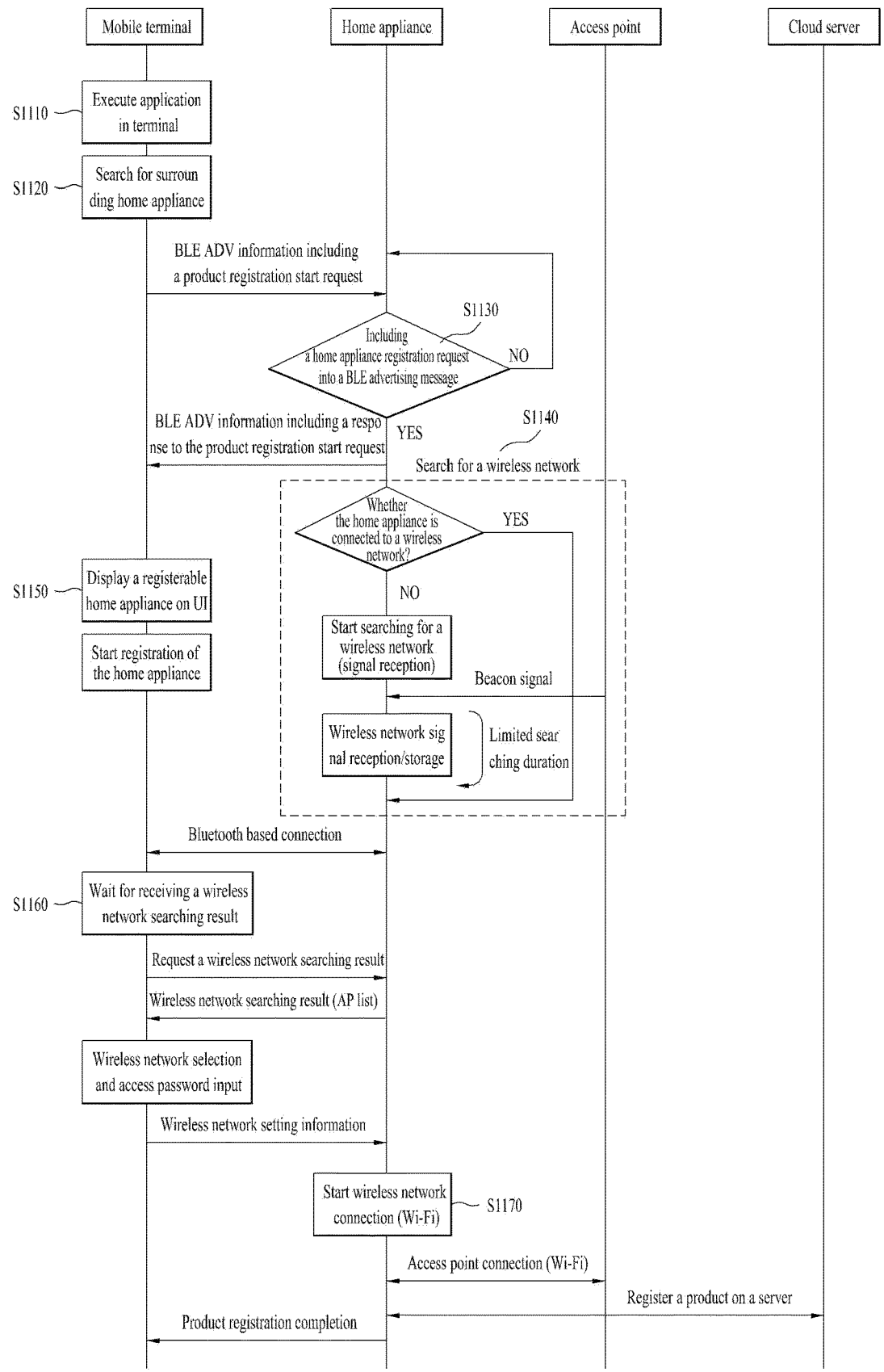
FIG. 11 shows a wireless network searching and setting method for wireless connection as performed by a home appliance connection device.

FIG. 11 shows a wireless network searching and configuration method for connection of the home appliance connection device to the wireless network.

The terminal device associated with the home appliance connection device according to embodiments of the present disclosure executes an application for the registration of the home appliance connection device S1110. The terminal device receives a user input and searches for home appliance connection devices to determine when there is a home appliance connection device that may be registered S1120. The terminal device transmits or advertises BLE data including information about start request of registration of the home appliance connection device to the home appliance connection device. In this connection, depending on the wireless network searching schemes by the terminal device, wireless network searching request information for the home appliance connection device is included in the advertising message. The home appliance connection device according to embodiments of the present disclosure receives BLE ADV (advertising) information including the registration start request from the terminal device.

After receiving the BLE ADV information, the home appliance connection device according to the present disclosure identifies whether the registration start request has been made based on the received BLE ADV information S1130. When it is determined based on the BLE ADV information received from the terminal device that the registration start request is made, the home appliance connection device transmits BLE ADV information including a response to the registration start request to the terminal device. When there is no registration start request in the BLE ADV information received from the terminal device, the home appliance connection device waits for the request.

When there is no wireless network currently connected to the home appliance connection device, the home appliance connection device according to embodiments of the present disclosure may start the wireless network search S1140. The home appliance connection device may receive the beacon signal from a surrounding wireless network (AP) for the wireless network search. When the home appliance connection device receives the beacon signal from the AP, the home appliance connection device stores wireless network information in the home appliance connection device. In this connection, a time duration for which the home appliance connection device searches for the wireless network may be limited. The home appliance connection device may set the searching time duration to reduce power consumption for searching the wireless network, and then the home appliance connection device may search for the wireless network for the set searching time duration. In one example, when there is a wireless network currently connected to the home appliance connection device, the home appliance connection device may skip performing the searching procedure and return access information about the currently connected wireless network to the terminal device when the device receives the registration start request from the terminal device.

While the home appliance connection device according to embodiments of the present disclosure searches for the wireless network, the terminal device associated with the home appliance connection device according to embodiments of the present disclosure receives the BLE ADV information including the response to the registration start request from the home appliance connection device. The terminal device identifies the response received from the home appliance connection device, and identifies whether the home appliance connection device that has transmitted the response has been registered on the server. When the home appliance connection device which has responded to the request is not registered on the server, the terminal device indicates on the UI of the terminal device that the corresponding home appliance connection device may be registered on the server S1150.

The terminal device associated with the home appliance connection device according to embodiments of the present disclosure may display that the home appliance connection device may be registered on the server on the UI of the terminal device. The terminal device connects to the home appliance connection device via BLE and requests a wireless network searching result toward the home appliance connection device. The terminal device may wait until the device has received the searching result from the home appliance connection device S1160. When BLE based connection between the terminal device and the home appliance connection device is established, information or data may communicate between the terminal device and the home appliance connection device in a Bluetooth GATT manner. In this connection, GATT may refer a scheme of transmitting and receiving data or information using services and/or characteristics between two BLE devices.

The home appliance connection device according to embodiments of the present disclosure receives the wireless network searching result request from the terminal device and transmits the wireless network searching result collected by the home appliance connection device up to a current time to the terminal device. The home appliance connection device may transmit the AP lists to the terminal device. When the wireless network search by the home appliance connection device is not completed when the home appliance connection device receives the request from the terminal device, the home appliance connection device may provide the terminal device with a previously searched result together with data indicating that the searching is "in progress" and then transmit a subsequently searched result to the terminal device. The terminal device may receive information about a wireless network selected by the user on the UI of the terminal device. In this case, the terminal device may receive access information or access password information to the selected wireless network from the user on the UI of the terminal device. The terminal device transmits, to the home appliance connection device, wireless network setting information including the access information and/or the access password information required for wireless network access.

The home appliance connection device according to embodiments of the present disclosure receives the wireless network setting information from the terminal device and performs connection between the home appliance connection device and the wireless network S1170. The home appliance connection device transmits a connection progress state between the home appliance connection device and the wireless network to the terminal device. The connection between the home appliance connection device and the wireless network may be performed in a Wi-Fi manner. When the home appliance connection device is connected to the wireless network (AP), the terminal device may register information about the home appliance connection device onto the cloud server. The home appliance connection device transmits, to the terminal device, a progress state of a process in which the home appliance connection device is registered onto the server. When the home appliance connection device has been registered on the server, the terminal device may remotely control the home appliance connection device via the cloud server.

Since the home appliance connection device performs the network search, a network suitable for connection to the home appliance connection device may be provided to the terminal device. The home appliance connection device may identify a supported standard of the wireless network or a signal strength of the wireless network based on the home appliance connection device, and may transmit, to the terminal device, the searching result of the wireless network as suitable for the home appliance connection device in the registration process of the home appliance connection device. The terminal device may select an optimal wireless network and connect to a home appliance connection device to remotely control the home appliance.

When the home appliance connection device is remotely registered on the server, the terminal device associated with the home appliance connection device according to embodiments of the present disclosure may transmit the wireless network searching request to the home appliance connection device using the BLE ADV information or message before BLE connection between the terminal device and the home appliance connection device is established. Accordingly, the searching result of the wireless network that may be established between the terminal device and the home appliance connection device may be provided to the user of the terminal device immediately after the connection between the terminal device home appliance connection device is established. The terminal device and the home appliance connection device according to embodiments of the present disclosure may effectively reduce the time duration required for the registration process of the home appliance connection device.

Further, because the BLE communication between the terminal device and the home appliance connection device is used for the registration of the home appliance connection device, the terminal device may perform the registration procedure of the home appliance connection device while the existing Wi-Fi connection is maintained. The terminal device may transmit and set access information about the currently connected wireless network to the home appliance connection device. Therefore, the home appliance connection device and the terminal device associated with the home appliance connection device according to embodiments of the present disclosure may effectively simplify the registration procedure of the home appliance connection device.

Furthermore, the terminal device associated with the home appliance connection device according to the present disclosure does not perform the wireless network search. Thus, the terminal device may perform the wireless network setting for the home appliance connection device even when the Wi-Fi is not activated, and the power consumption of the terminal device itself may be effectively reduced.

Figure 12:
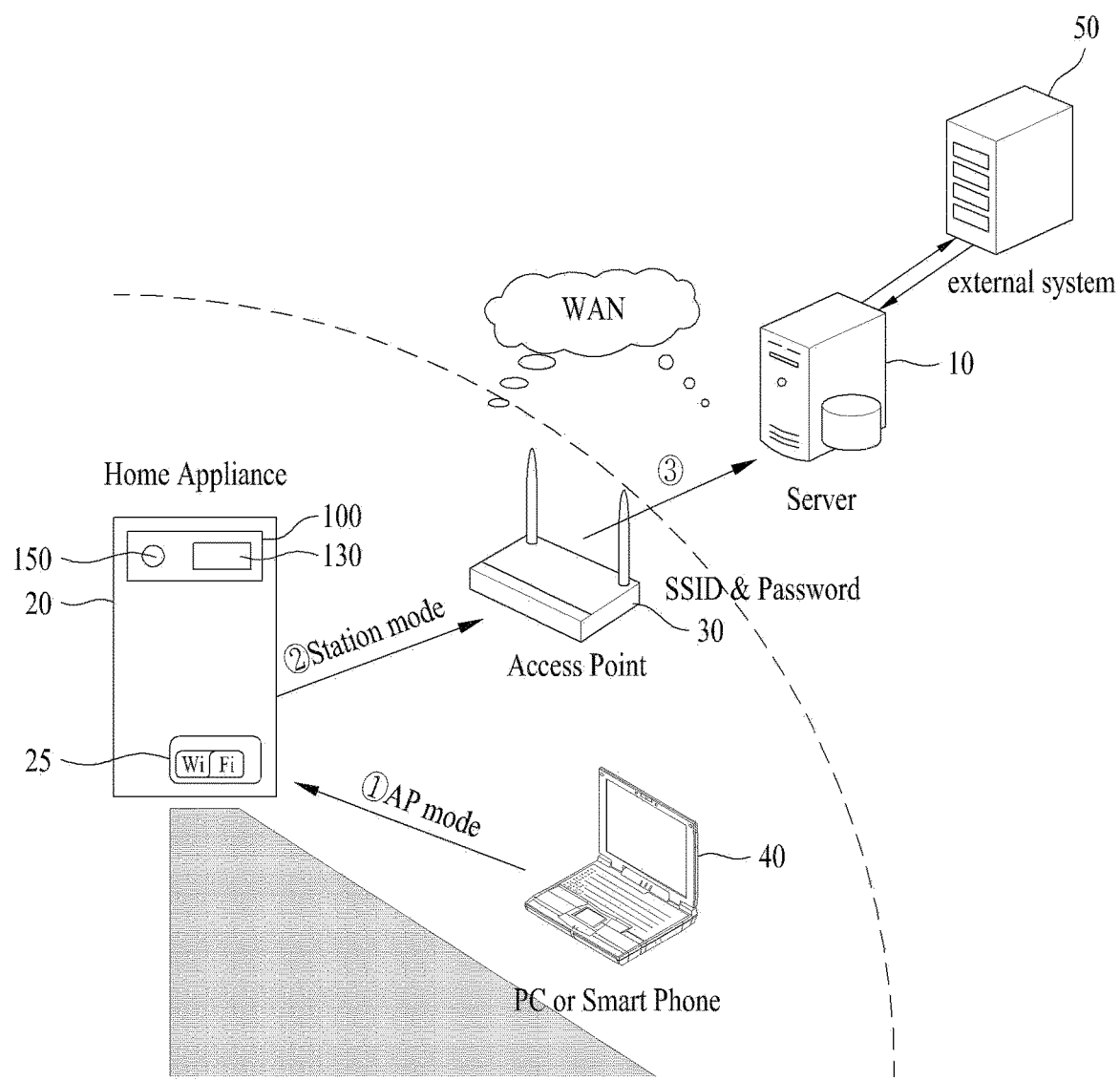
FIG. 12 shows a configuration of a network between a home appliance, a terminal device, and a server.

FIG. 12 shows a configuration of a network between the home appliance connection device, the terminal device, and the server.

The home appliance connection device according to embodiments of the present disclosure may include a Wi-Fi communication module supporting a setting mode (or the station mode) for communication establishment with the server in order to set connection information to the wireless network, and a use mode (or the AP mode) for communication therewith.

The terminal device associated with the home appliance connection device according to embodiments of the present disclosure may include a PC or a smart terminal device. The terminal device may access the server under the setting mode. AP information is required for the home appliance connection device to access the wireless network. In this connection, the AP information may include information including an SSID and a password related to the wireless network. The home appliance connection device may receive the AP information from the terminal device and access the wireless network using the AP information, and thus the home appliance connection device may be registered onto the server.

The home appliance connection device according to embodiments of the present disclosure registers the home appliance on the server, and the terminal device automatically searches for the home appliance. The home appliance connection device may connect the terminal device and the home appliance with each other. The terminal device may set the wireless network information to be used by the home appliance, and the home appliance connection device allows the home appliance to access the registration server and perform registration thereof thereon. The home appliance or the terminal device associated with the home appliance connection device according to embodiments of the present disclosure may have a limited user interface. Even in the limited user interface situation, a simplified and efficient procedure is required for the wireless network searching by the home appliance connection device and the registration of the home appliance.

The home appliance connection device according to embodiments of the present disclosure enables the terminal device to be able to search for and connecting to the wireless network at any time, and minimizes power consumption for this process.

In order for the home appliance connection device according to the present disclosure to set the wireless network, the home appliance may be converted into a wireless access device (AP) using a Wi-Fi module in the home appliance. After the connection between the home appliance and the terminal device is established, the terminal device transmits information stored in the terminal device to the home appliance connection device. When setting the Wi-Fi of the home appliance, the Wi-Fi module may set the Wi-Fi using information received by the home appliance connection device without additional user manipulation.

Using the home appliance connection device according to embodiments of the present disclosure, the home appliance may be simply registered on the server. The home appliance connection device may receive SSID information, etc. about the wireless network under the AP mode. The home appliance connection device transmits the received SSID information to the terminal device. The terminal device may control the home appliance connection device using the received SSID information to allow the home appliance connection device to connect to the wireless network. The terminal device may transmit network information and information about the user of the terminal device to the home appliance connection device. In this connection, the home appliance connection device accesses the wireless network based on the network information and the user information received from the terminal device under the station mode.

A connection method of a home appliance to a wireless network by a home appliance connection device according to embodiments of the present disclosure is as follows. The home appliance connection device may connect to the terminal device under the AP mode. In order for the home appliance connection device to use the AP mode, user intervention may be required, or a process of receiving an AP mode switching message or a tagging input from another device or another terminal device may be required. The home appliance connection device according to embodiments of the present disclosure may receive the AP mode switching signal via user manipulation of a specific button of the home appliance or a specific input interface thereof. Therefore, the user intervention process in the home appliance registration process may be minimized and manipulation error may be prevented.

The terminal device associated with the home appliance connection device according to embodiments of the present disclosure executes an application to start the home appliance registration process. The terminal device may guide the user for the registration process of the home appliance including the AP mode switching method. Upon receiving an input signal from the user of the terminal device, the home appliance connection device switches the mode of the wireless LAN device to the AP mode. If the power of the home appliance is turned off, the power of the wireless LAN device of the home appliance is turned on. The terminal device may search for wireless networks around the terminal device and display the searching result to the user. Based on the wireless network detected by the terminal device, the user may enter the wireless network and a password for the wireless network into the terminal device. Furthermore, the home appliance connection device may support an automatic setting function. Using the auto-setting function, the home appliance connection device may automatically set a wireless network previously used by the home appliance or a wireless network to which the terminal device is currently connected. The home appliance connection device may receive wireless network information (SSID, password, channel, etc.) from the terminal device. The home appliance connection device switches the AP mode to the station mode, and performs wireless network connection using the wireless network information received from the terminal device. The home appliance connection device which has accessed the wireless network accesses the server and completes the registration of the home appliance on the server. The terminal device may disconnect from the home appliance connection device and access the server to identify whether the home appliance is normally registered thereon. When the registration fails, the terminal device displays failure information to the user.

The home appliance connection device according to embodiments of the present disclosure minimizes the process of switching the wireless LAN mode of the home appliance to the AP mode. The present disclosure proposes a method for simplifying a procedure including receiving a signal from the user via an input device of the home appliance or triggering a specific event.

Figure 13:
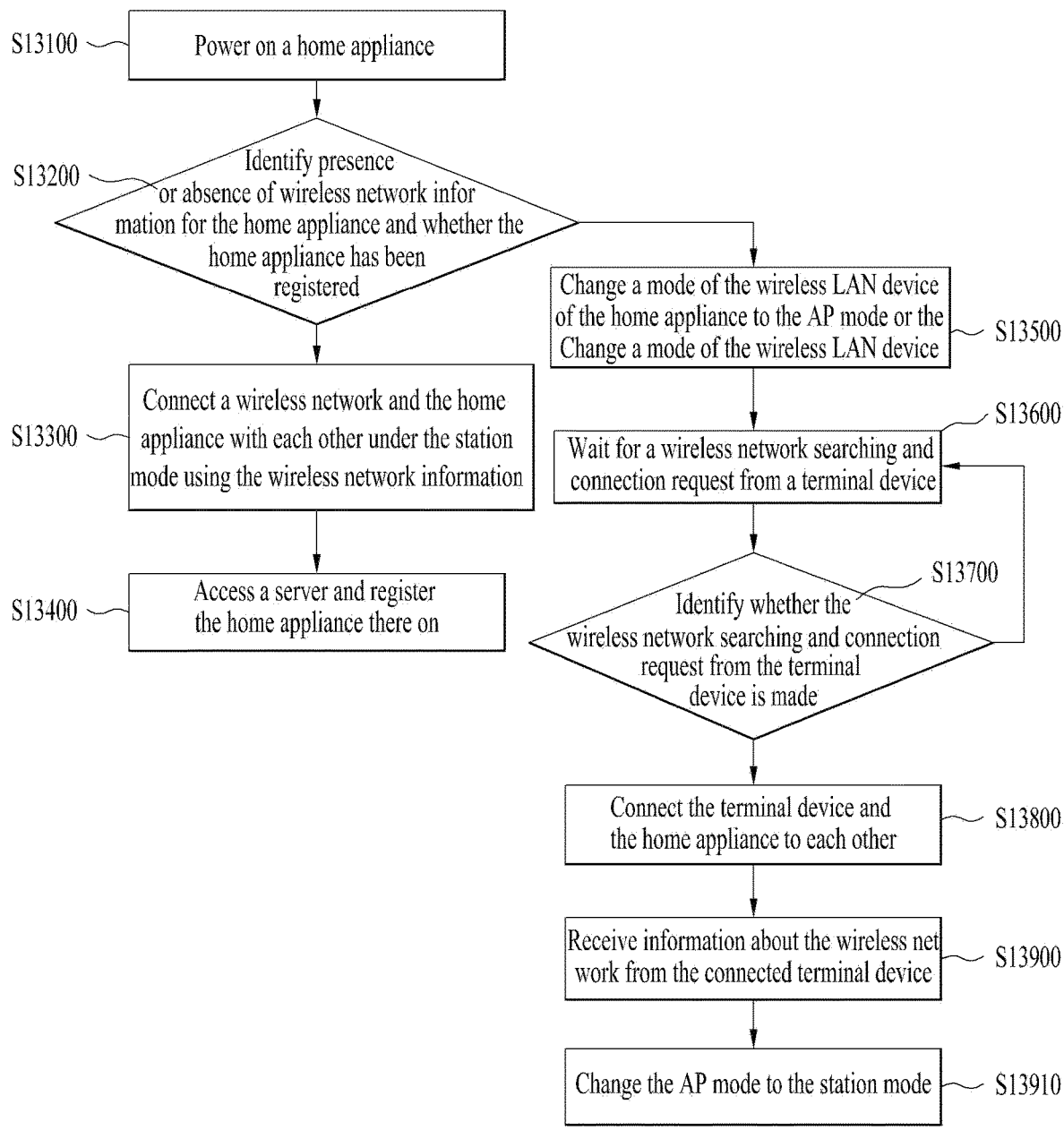
FIG. 13 shows an always powering-on method of a wireless LAN device as performed by a home appliance connection device.

FIG. 13 shows an always powering-on method of the wireless LAN device as performed by the home appliance connection device.

When the power of the home appliance is turned on or the power is applied to the wireless LAN device in the home appliance, the home appliance connection device according to embodiments of the present disclosure identifies whether the home appliance has registered on the server. When the home appliance has not been registered, the home appliance connection device switches the mode of the wireless LAN device to the AP mode or allow the wireless LAN device to operate in the concurrent mode. When the power of the home appliance or the wireless LAN device is turned on, the home appliance connection device may always search for and connect to the home appliance under control of the terminal device. When the power of the home appliance or the wireless LAN device is always on, the home appliance connection device may wait for a certain time duration in the AP mode or the concurrent mode for registration and then may automatically power off the wireless LAN device. This may save power consumption of the home appliance.

The home appliance connection device according to embodiments of the present disclosure may power on the home appliance S13100. When power-on of the wireless LAN device of the home appliance may be set, the home appliance connection device may power on the wireless LAN device. The home appliance connection device may power on the wireless LAN device upon receiving an input signal related to the power on. For the home appliance has an input interface for powering on the wireless LAN device, when the home appliance is powered on, the home appliance connection device may immediately power on the wireless LAN device.

The home appliance connection device according to embodiments of the present disclosure identifies presence or absence of the wireless network information for the home appliance and whether the home appliance has been registered S13200. When the home appliance connection device already has the wireless network information and the registration of the home appliance is completed, the home appliance connection device connects the wireless network and the home appliance with each other under the station mode using the stored wireless network information S13300. Thereafter, over the wireless network connected to the home appliance, the home appliance receives a control command from an external device or the terminal device via the external server S13400.

When the wireless LAN device of the home appliance is powered on, the home appliance connection device according to embodiments of the present disclosure may change the mode of the wireless LAN device of the home appliance to the AP mode S13500. When the wireless LAN device supports the concurrent mode, the home appliance connection device changes the mode of the wireless LAN device of the home appliance to the concurrent mode. Even when the mode of the wireless LAN device is changed to the concurrent mode, the station mode is not activated but only the AP mode is activated.

Since the mode of the wireless LAN device has been changed to the AP mode or the concurrent mode, the home appliance connection device according to embodiments of the present disclosure waits for the wireless network searching and connection request from the terminal device S13600.

The home appliance connection device according to embodiments of the present disclosure identifies whether the wireless network searching and connection request from the terminal device is made S13700. Upon receiving the wireless network searching and connection request from the terminal device, the home appliance connection device connects the terminal device and the home appliance to each other S13800. The home appliance connection device sets the wireless network upon receiving information about the wireless network from the connected terminal device S13900. The home appliance connection device changes the AP mode to the station mode. In the concurrent mode, the home appliance connection device activates the station mode while maintaining the connection between the terminal device and the home appliance in the AP mode S13910. The home appliance connection device in the station mode connects the wireless network and the home appliance to each other using the wireless network information. When the home appliance and the wireless network are connected to each other, the home appliance connection device accesses the server and completes the registration of the home appliance thereon.

After the completion of the registration, the home appliance connection device according to embodiments of the present disclosure may allow the wireless LAN device under the concurrent mode to operate only in the station mode, and may deactivate the AP mode. Since there is no need to continuously maintain the connection between the home appliance and the terminal device after the registration is completed, the home appliance connection device may deactivate the AP mode in order to save power required to power the wireless LAN device.

The home appliance connection device according to embodiments of the present disclosure may save power consumption due to the always powering-on of the wireless LAN device using a following method. This method is to solve a problem that the wireless LAN device consumes the power before the registration if the wireless LAN device of the home appliance is continuously activated in the AP mode or the concurrent mode even when the user does not register the home appliance. It may not be a problem that the wireless LAN device of the home appliance has a small effect on a total power consumption of the home appliance. However, in a home appliance using a battery, a measure to reduce the power consumption is required.

Figure 14:
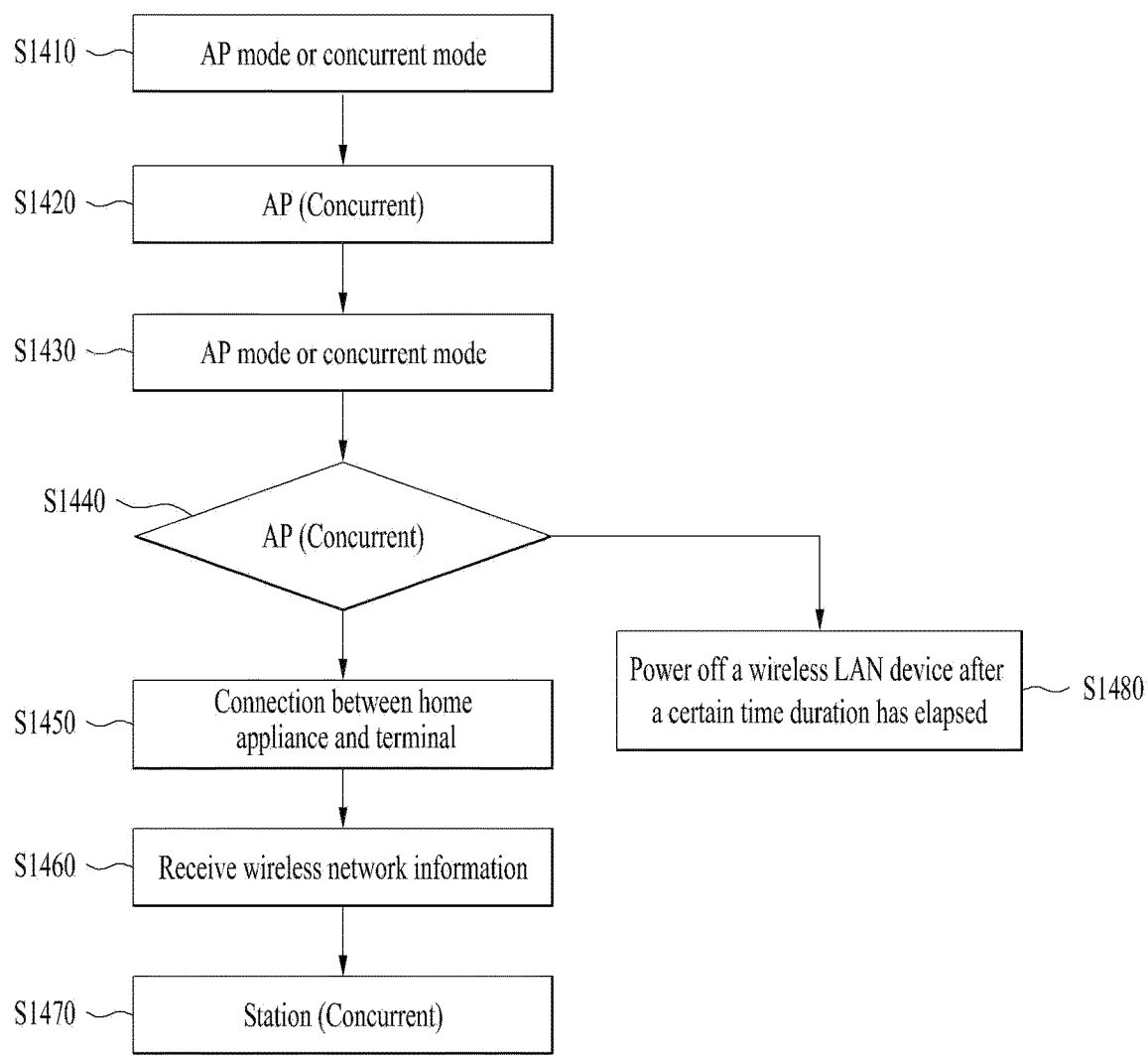
FIG. 14 shows a method in which a home appliance connection device always powers on a wireless LAN device and automatically powers off the wireless LAN device during a waiting time for registration of a home appliance.

FIG. 14 shows a method in which a home appliance connection device always powers on a wireless LAN device and automatically powers off the wireless LAN device during a waiting time for registration of a home appliance.

In FIG. 14, operations up to an operation of waiting for the wireless network searching and connection request from the terminal device because the home appliance is powered on or the wireless LAN device power is powered on may be the same as or similar to those of the process of FIG. 13. That is, the operations S1410 to S1470 are the same as or similar to the operations S13500 to S13910 of FIG. 13.

When the home appliance connection device according to the present disclosure does not receive the wireless network searching and connection request from the terminal device for a predetermined time duration in the operation S1440 or S13700 in which the home appliance connection device waits for the wireless network searching and connection request therefrom, the home appliance connection device powers off the wireless LAN device of the home appliance to reduce power consumption S1480. In this connection, the predetermined time duration may vary based on a type of the home appliance. When the home appliance is frequently powered on and off, the predetermined time duration may be set to be smaller. The wireless LAN device may be re-powered on upon receiving the user's input or when the home appliance is powered on. Alternatively, the wireless LAN device may be re-powered in various manner such as when the wireless LAN device is turned on.

Figure 15:
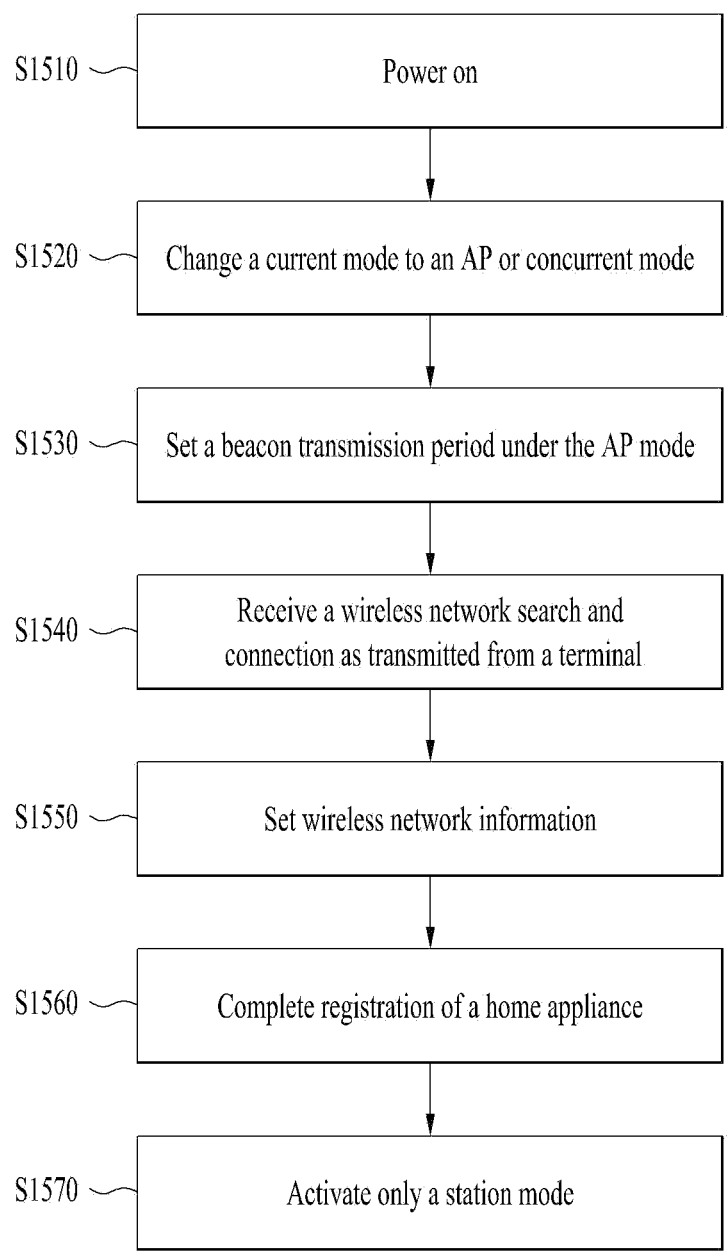
FIG. 15 shows an always powering-on method of a wireless LAN device of a home appliance via setting a beacon message transmission period.

FIG. 15 shows an always powering-on method of a wireless LAN device of a home appliance via setting a beacon message transmission period.

The home appliance connection device according to embodiments of the present disclosure transmits a beacon message (or a broadcast message) every period in the AP mode when the wireless LAN device of the home appliance is operating in the AP mode and the concurrent mode for the registration of the home appliance. Further, the home appliance connection device may set a transmission period value at which the beacon message (or the broadcast message) is transmitted to be larger. In this case, the home appliance connection device may reduce the power consumption due to the beacon message transmission. Further, in consideration of a type of the home appliance and a type of the terminal device, the beacon message transmission period may vary. The controller of the home appliance connection device according to embodiments of the present disclosure may control the transmission period value at which the beacon message (or the broadcast message) is transmitted. In the above-described embodiment of FIG. 14, when the wireless LAN device of the home appliance is automatically powered off, the user may need to power off or off the wireless LAN device of the home appliance. However, in an embodiment of FIG. 15, there is no user involvement.

The home appliance including the home appliance connection device according to the present disclosure is powered on or the wireless LAN device of the home appliance is powered on S1510.

The home appliance connection device according to embodiments of the present disclosure changes the mode of the wireless LAN device of the home appliance to the AP mode or the concurrent mode S1520.

The home appliance connection device according to embodiments of the present disclosure sets the beacon transmission period under the AP mode to be used in the home appliance before starting the operation of the wireless LAN device of the home appliance under the AP mode S1530. The home appliance connection device may set the beacon transmission period under the AP mode to 100 ms or 200 ms. when the period value is larger than 200 ms, the terminal device may not be able to search for the home appliance. Thus, the beacon transmission period value may be smaller than or equal to 200 ms.

When receiving the wireless network searching and connection request transmitted from the terminal device, the home appliance connection device according to embodiments of the present disclosure connects the terminal device and the home appliance to each other S1540.

The home appliance connection device according to embodiments of the present disclosure sets wireless network information to be used in the home appliance via the terminal device S1550.

The home appliance connection device according to embodiments of the present disclosure changes the mode of the wireless LAN device of the home appliance to the station mode or activates the station mode under the concurrent mode using the wireless network information set in the home appliance. Under the activated station mode, the home appliance connection device completes the connection between the home appliance and the wireless network, and completes the registration of the home appliance via the connected wireless network S1560.

When the registration of the home appliance is completed, the home appliance connection device according to the present disclosure uses only the station mode of the wireless LAN device or activates only the station mode under the concurrent mode. The home appliance connection device may deactivate the AP mode to reduce power consumption due to the activation of the AP mode S1570.

Figure 16:
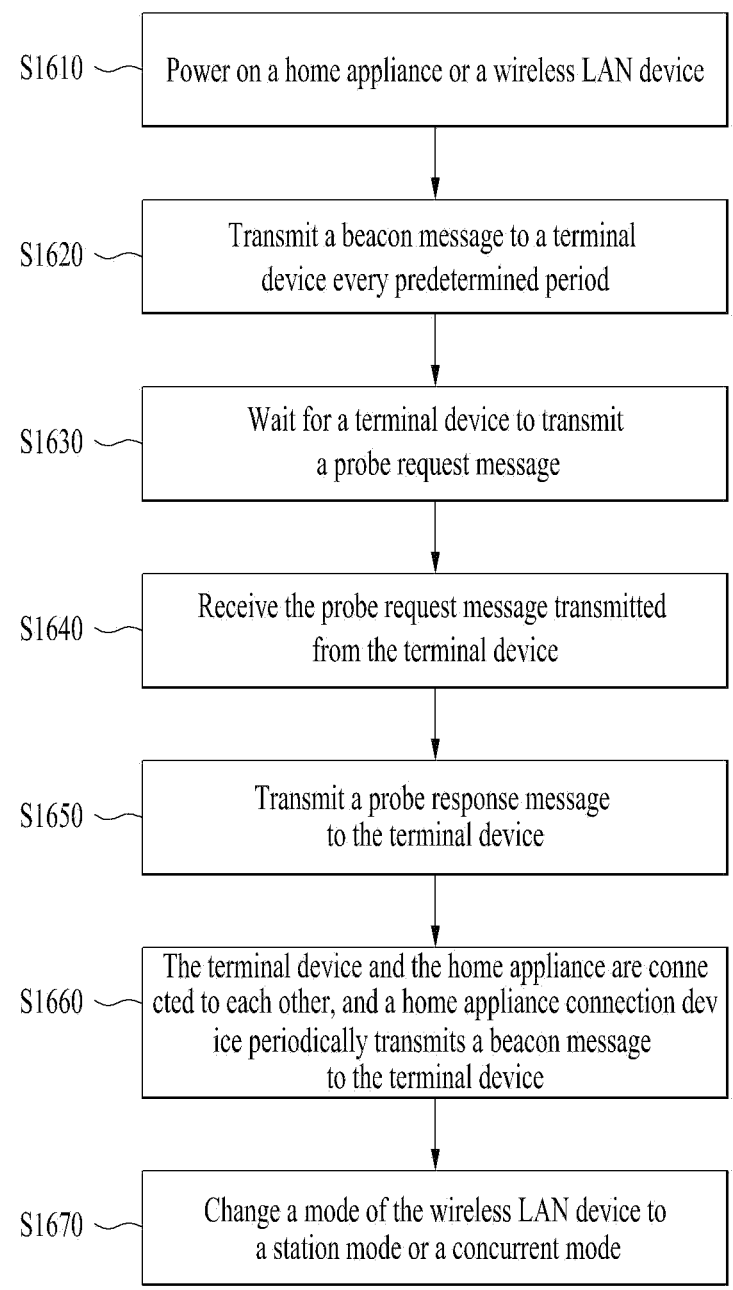
FIG. 16 shows a method in which a home appliance connection device always powers on a wireless LAN device via active scanning support of a home appliance.

FIG. 16 shows a method in which a home appliance connection device always powers on a wireless LAN device via active scanning support of a home appliance.

The home appliance connection device according to embodiments of the present disclosure may always power on the wireless LAN device by reducing message transmission that generates a lot of power when waiting under the AP mode.

The home appliance or the wireless LAN device associated with the home appliance connection device according to embodiments of the present disclosure is powered on S1610.

The home appliance connection device according to embodiments of the present disclosure may transmit the beacon message to the terminal device every predetermined period under the AP mode of the wireless LAN device of the home appliance or the AP mode under the concurrent mode S1620. Based on the beacon message transmitted from the home appliance connection device, the terminal device may make the wireless network searching and connection toward the home appliance.

The home appliance connection device according to embodiments of the present disclosure operates in an always receipt waiting state and waits for the terminal device to transmit a probe request message for search to the home appliance at any time S1630. When the home appliance connection device is in the receipt waiting state, power must be continuously supplied to the wireless LAN device. Because the terminal device receives the beacon message transmitted from the home appliance connection device for home appliance search, or transmits the probe request message to the home appliance, and then receives a probe response message from the home appliance, the home appliance must transmit a beacon message every period and wait for reception of the probe request message. The receiver of the home appliance connection device according to embodiments of the present disclosure may receive the probe request message from the terminal device. The transmitter of the home appliance connection device according to embodiments of the present disclosure may transmit the probe response message to the terminal device. The controller of the home appliance connection device according to embodiments of the present disclosure may control an operation of the receiver, the transmitter, and/or the connection operation between the home appliance and the terminal device in an active scanning manner to be described later.

The terminal device associated with the home appliance connection device according to embodiments of the present disclosure supports an active scanning scheme. The active scanning scheme refers to a scheme of transmitting the probe request message to a wireless network when the terminal device searches for a nearby wireless network and of receiving the probe response message from the wireless network. The home appliance connection device according to embodiments of the present disclosure does not use a periodic transmission scheme of a beacon message for supporting a passive scanning scheme as a beacon message receiving scheme that the terminal device does not use. A device using the passive scanning scheme does not transmit a beacon message, but only receives the beacon message from an external device. Accordingly, the home appliance connection device may not transmit the beacon message for the passive scanning scheme to reduce the power consumption during a time duration for the terminal device waits for searching for the product registration. The home appliance connection device according to embodiments of the present disclosure does not need to transmit a beacon message, and waits for receiving the probe request message transmitted from the terminal device. Accordingly, the home appliance connection device may reduce power consumption due to the waiting state.

In other words, the home appliance connection device waits for the probe request message transmitted from the terminal device S1630. Thereafter, the home appliance connection device receives the probe request message transmitted from the terminal device for the active scanning S1640, and the home appliance connection device transmits the probe response message to the terminal device S1650. When the terminal device receives a connection request via the probe response message, the terminal device and the home appliance may be connected to each other S1660. After the terminal device and the home appliance are connected to each other, the home appliance connection device may periodically transmit a beacon message to the terminal device S1660. The home appliance connection device may maintain the connection between the home appliance and the terminal device via the periodic transmission of the beacon message. In this approach in which the home appliance connection device does not transmit the beacon message before the connection, the power reduction is greater compared to reduction of power consumed for the home appliance connection device to transmit the beacon message after the connection.

The home appliance connection device completes the registration of the home appliance and changes the mode of the wireless LAN device of the home appliance to the station mode or activates only the station mode under the concurrent mode S1670. The station mode is used to connect the home appliance to the wireless network, while the AP mode is used to connect the home appliance and the terminal device with each other. The home appliance connection device may complete the registration of the home appliance over the connected wireless network. After the completion of the registration, the home appliance connection device may activate only the station mode or deactivate the AP mode to reduce the power consumption of the home appliance.

Figure 17:
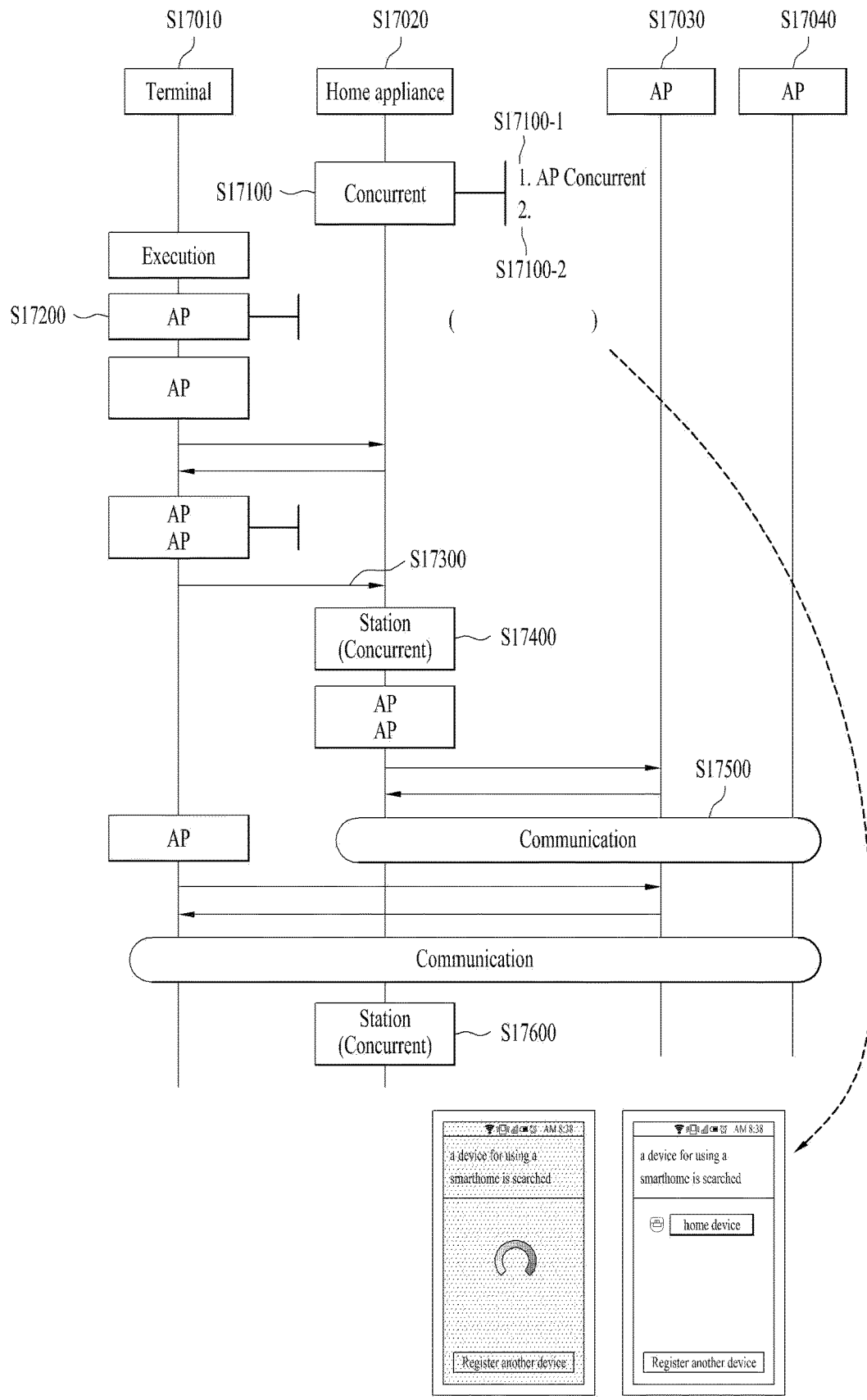
FIG. 17 shows an always powering-on method of a wireless LAN device of a home appliance.

FIG. 17 shows an always powering-on method of the wireless LAN device of the home appliance. FIG. 17 specifically describes the method described in FIG. 13.

When the home appliance S17020 associated with the home appliance connection device according to embodiments of the present disclosure has an input interface for powering on the wireless LAN device, the wireless LAN device of the home appliance may be powered on using the input interface. When the wireless LAN device is powered on using the input interface, The home appliance connection device identifies whether THE registration of the home appliance has been completed. When the registration is not completed, the home appliance connection device changes the mode of the wireless LAN device to the AP mode or the concurrent mode S17100 and S17100-1. In this connection, under the concurrent mode, the AP mode is activated and the station mode is deactivated. When the registration is completed, the home appliance connection device sets the mode of the wireless LAN device to the station mode. Under the station mode, the home appliance connection device connects the home appliance to wireless networks 17030 and 17040 and the server, and allows the terminal device S17010 to control the home appliance.

When the home appliance has no input interface for powering on the wireless LAN device and the wireless LAN device is powered on when the home appliance is powered on, the home appliance connection device identifies whether the registration of the home appliance has been completed. When the registration is not completed, as in the above-described operation, the home appliance connection device sets the mode of the wireless LAN device to the AP mode or the concurrent mode S17100, and S17100-2.

The terminal device 17010 associated with the home appliance connection device according to embodiments of the present disclosure may execute an application to automatically or manually search for a home appliance S17200. When the home appliance is operating under the AP mode or the concurrent mode, the terminal device may search for the home appliance at any time S17200-1. After the terminal device has searched for the home appliance, the terminal device may transmit a connection request to the home appliance and the terminal device and the home appliance may be connected to each other.

When the wireless network information about the home appliance is automatically set in internal settings of the terminal device associated with the home appliance connection device according to embodiments of the present disclosure, the terminal device may automatically select a wireless network to be used by the home appliance without user intervention on the terminal device and transmit the wireless network information about the selected network to the home appliance S17300. The wireless network automatic selection as performed by the terminal device may be performed based on wireless network information previously set in the home appliance. Alternatively, the wireless network information about a wireless network currently connected to the terminal device may be selected.

Upon receiving the wireless network information from the terminal device associated with the home appliance connection device according to embodiments of the present disclosure, the home appliance connection device identifies a mode of the wireless LAN device of the home appliance. When the mode of the wireless LAN device is currently the AP mode, the home appliance connection device changes the mode thereof to the station mode S17400. Alternatively, the home appliance connection device maintains the mode as the concurrent mode when the mode of the wireless LAN device is currently the concurrent mode, and then activates the station mode under the concurrent mode in addition to the activated AP mode.

The home appliance connection device according to embodiments of the present disclosure connects the home appliance to the wireless network using the wireless network information received from the terminal device S17500. Over the connected wireless network, the home appliance connection device accesses the server and completes the registration of the home appliance.

When the connection and registration of the home appliance to and on the server are completed, the home appliance connection device maintains the station mode when the mode of the home appliance wireless LAN device is currently the station mode S17600. Under the concurrent mode in which both the AP mode and the station mode of the wireless LAN device are activated, the home appliance connection device may deactivate the AP mode and activate only the station mode to reduce the power consumption of the home appliance.

Figure 18:
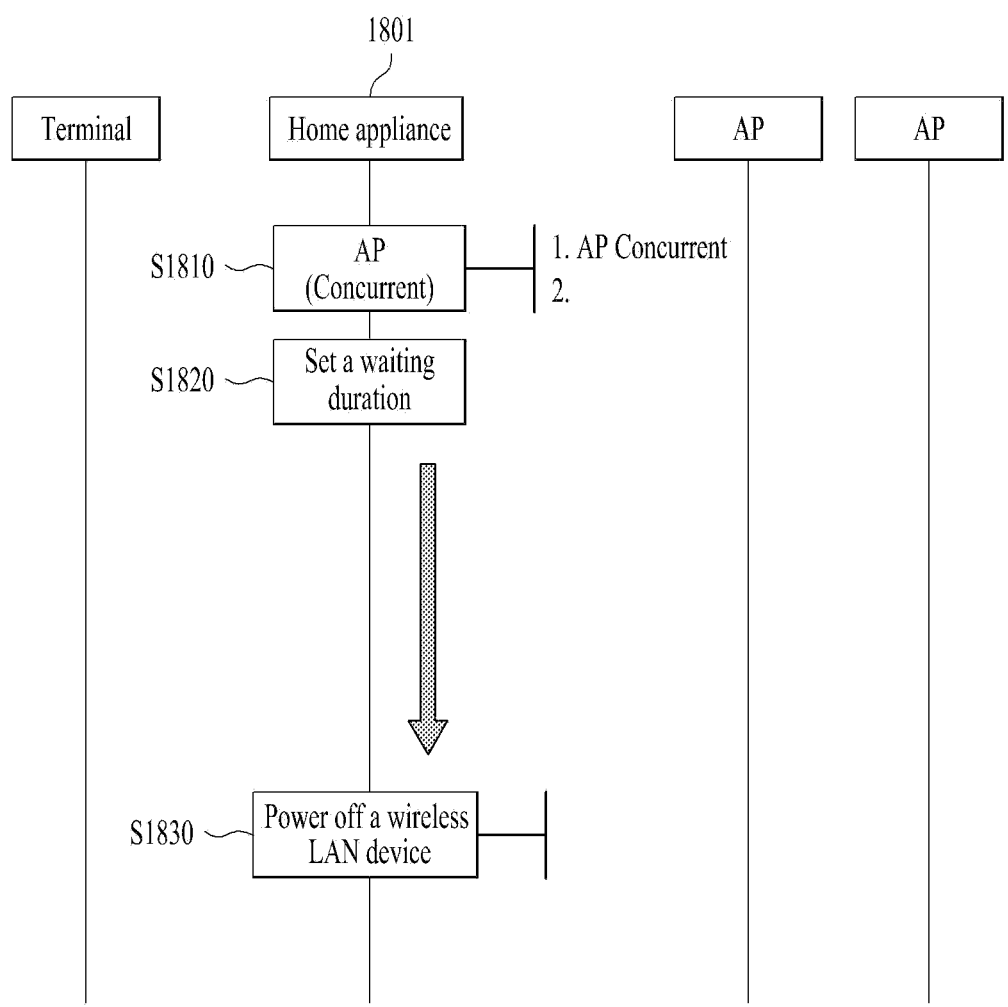
FIG. 18 shows a method in which a home appliance connection device always powers on a wireless LAN device of a home appliance and automatically powers off the wireless LAN device during a waiting time for registration of the home appliance.

FIG. 18 shows a method in which a home appliance connection device always powers on a wireless LAN device of a home appliance and automatically powers off the wireless LAN device during a waiting time for registration of the home appliance. FIG. 18 specifically describes the method described in FIG. 14.

A home appliance connection device 1801 according to embodiments of the present disclosure sets the mode of the wireless LAN device to the AP mode and/or the concurrent mode for the registration of the home appliance 1801 S1810. The home appliance connection device sets a maximum waiting duration for the connection request transmitted from the terminal device, and activates a timer S1820.

When the home appliance connection device according to the present disclosure receives the connection request from the terminal device within the maximum waiting duration, the home appliance connection device connects the home appliance to the terminal device and completes the registration of the home appliance. The home appliance connection device stops the timer for the maximum waiting duration.

When the home appliance connection device according to the present disclosure does not receive the connection request from the terminal device within the maximum waiting duration until the timer expires, the home appliance connection device automatically powers off the wireless LAN device and suppresses the power consumption of the home appliance S1830.

Figure 19:
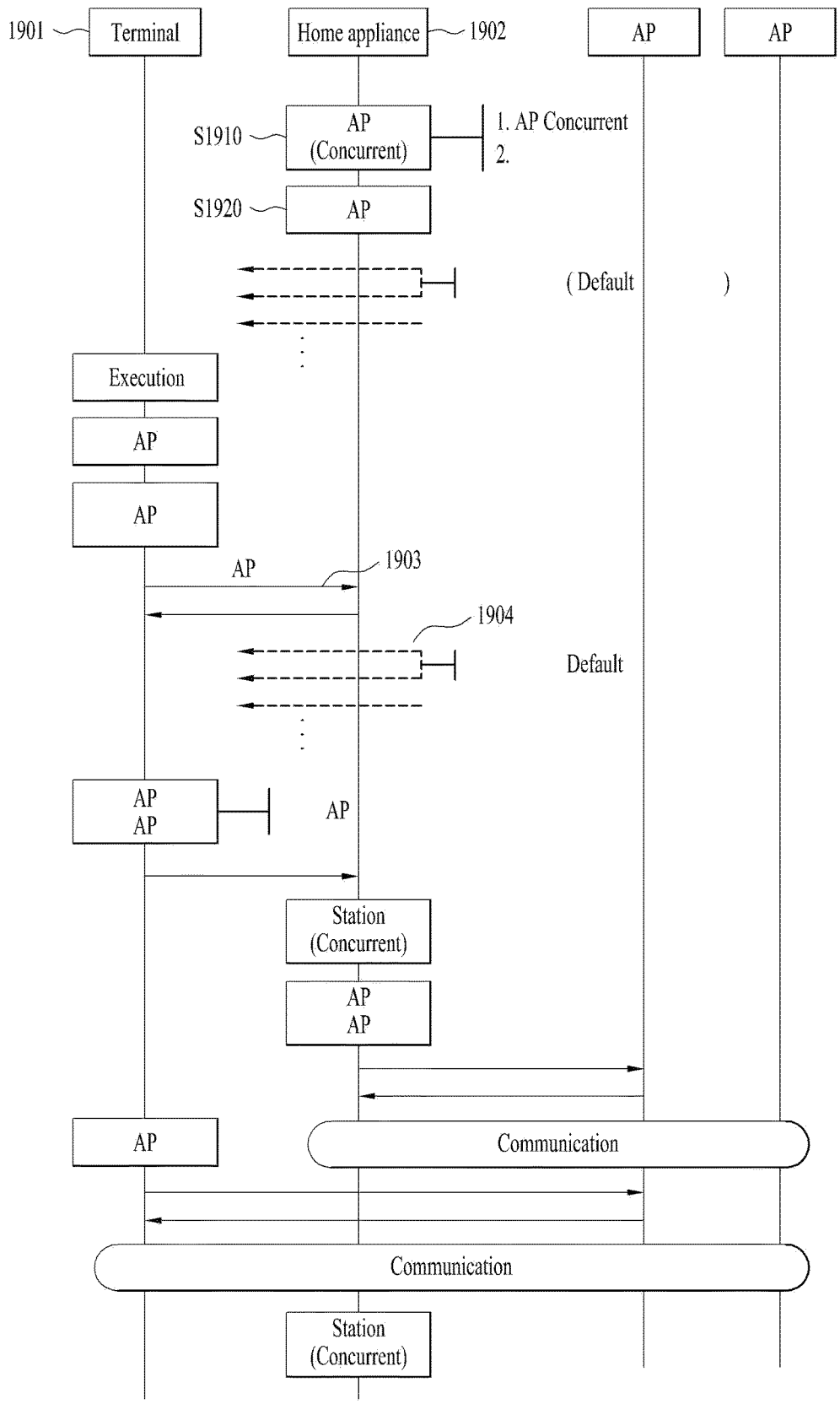
FIG. 19 shows an always powering-on method of a wireless LAN device of a home appliance via setting a beacon message transmission period.

FIG. 19 shows an always powering-on method of a wireless LAN device of a home appliance via setting a beacon message transmission period. FIG. 19 specifically describes the method described in FIG. 15.

The home appliance connection device according to embodiments of the present disclosure sets the mode of the wireless LAN device to the AP mode or the concurrent mode for registration of the home appliance (under the concurrent mode, only the AP mode is activated) S1910. The home appliance connection device sets the transmission period at which the beacon message is transmitted in the AP mode S1920. The home appliance connection device may set the transmission period of the beacon message to be larger than a default value to reduce the power consumption of the home appliance. Since the home appliance connection device does not know when the terminal device transmits the connection request for the registration, the larger transmission period may be preferred. However, in this case, the terminal device may not be able to search for the home appliance. Thus, depending on an embodiment, the default value of the transmission period may be 100 ms. A maximum transmission period may be smaller than or equal to 200 ms.

The terminal device 1901 searches for the home appliance 1902 and transmits the connection request to the home appliance. When the home appliance connection device receives the connection request from the terminal device 1903, the terminal device and the home appliance are connected to each other. The home appliance connection device sets the beacon message transmission period to the default value and maintains the connection between the terminal device and the home appliance 1904. A subsequent operation process is the same as shown in FIG. 17.

Figure 20:
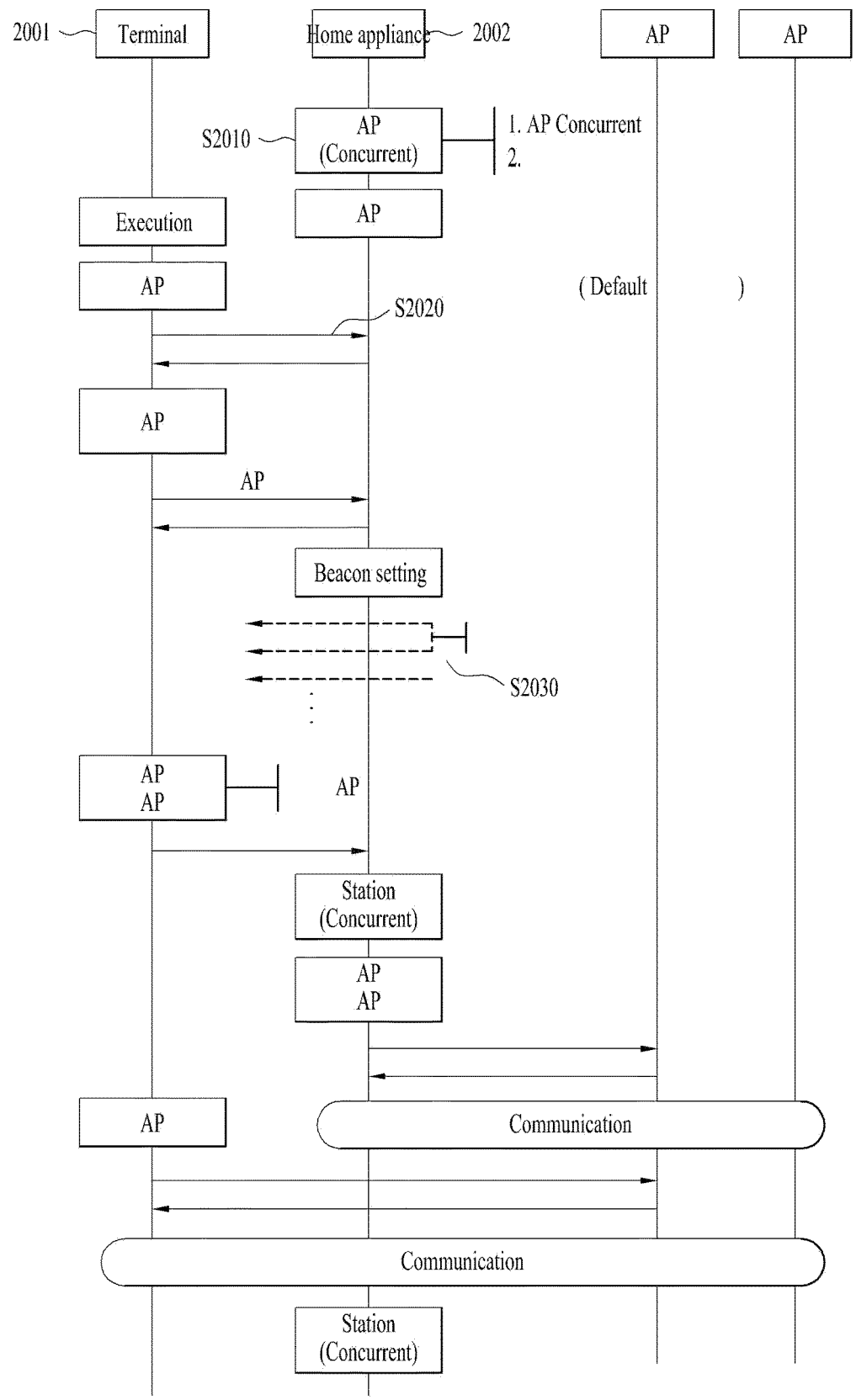
FIG. 20 shows a method for supporting an always powering-on of a wireless LAN device via active scanning support of a home appliance.

FIG. 20 shows a method of supporting an always powering-on of a wireless LAN device via active scanning support of a home appliance. FIG. 20 specifically describes the method described in FIG. 16.

A home appliance connection device 2002 according to embodiments of the present disclosure sets the mode of the wireless LAN device to the AP mode or the concurrent mode (under the concurrent mode, only the AP mode is activated) S2010. Under the AP mode, the home appliance connection device does not transmit the beacon message, but waits for receiving the probe request message from the terminal device 2001. The terminal device associated with the home appliance connection device according to embodiments of the present disclosure does not support the passive scanning scheme of receiving the beacon message and searching for the home appliance. The terminal device supports the active scanning scheme in which the terminal device receives the probe response message to the probe request message transmitted from the terminal device and searches for the home appliance. The home appliance connection device may not transmit the beacon message that is otherwise transmitted every period, thereby reducing the power consumption of the home appliance until receiving the connection request from the terminal device for the registration.

The home appliance connection device according to embodiments of the present disclosure receives the probe request message from the terminal device and transmits the probe response message to the terminal device S2020.

After the terminal device has searched for the home appliance, the terminal device transmits the connection request to the home appliance. The home appliance connection device receives the connection request transmitted from the terminal device. The home appliance connection device connects the home appliance and the terminal device to each other. The home appliance connection device transmits the beacon message to the terminal device every default value period S2030. The beacon message as transmitted every period allows the connection between the terminal device and the home appliance to be maintained. A subsequent operation process is the same as shown in FIG. 17.

It is understood by those skilled in the art that various changes and modifications may be made in the present disclosure without departing from the spirit or scope of the present disclosure. Accordingly, the present disclosure is intended to cover the modifications and variations of the present disclosure provided within the appended claims and their equivalent scope.

Both the device and method inventions are mentioned herein, and descriptions of both the device and method inventions may complement each other.

A module, a unit, or a block according to embodiments of the present disclosure may be embodied as a processor, hardware, or software that executes successive processes stored in a memory (or a storage unit). Each of the steps or the methods as described in the above-described embodiments may be performed by a processor, hardware, or software. Further, the methods presented in the present disclosure may be executed using computer codes. The codes may be recorded to a storage medium that may be read by a processor, and thus may be read by a processor include in the device according to embodiments of the present disclosure.

The various embodiments have been set forth above to realize the present disclosure.

INDUSTRIAL AVAILABILITY

The present disclosure may be applied to broadcasting signal provision.

It is understood by those skilled in the art that various changes and modifications may be made in the present disclosure without departing from the spirit or scope of the present disclosure. Accordingly, the present disclosure is intended to cover the modifications and variations of the present disclosure provided within the appended claims and their equivalent scope.

What is claimed is:

1. A home appliance connection method comprising:
   setting a wireless mode to a station mode;
   periodically searching for a wireless network under the station mode; and
   upon receiving a wireless network searching request from a terminal device, transmitting information about a searched wireless network to the terminal device,
   wherein the method further comprises receiving information about a wireless network searched by the terminal device,
   wherein in the information about the wireless network searched by the terminal device, a wireless network not associated with a home appliance associated with the terminal device is excluded in a filtered manner.

2. The home appliance connection method of claim 1, wherein the method further comprises:
   when the wireless mode is the station mode, periodically changing the wireless mode to an access point (AP) mode; and
   periodically transmitting a beacon message to the terminal device under the AP mode.

3. The home appliance connection method of claim 1, wherein the method further comprises:
  receiving a first advertising message from the terminal device via Bluetooth communication, wherein the first advertising message includes a registration request of the home appliance;
  in response to receipt of the first advertising message, transmitting a second advertising message to the terminal device via Bluetooth communication; and
  searching for a wireless network in response to the reception of the first advertising message.

4. The home appliance connection method of claim 1, wherein the method further comprises:
  powering on the home appliance associated with the terminal device;
  identifying whether the home appliance has been registered;
  when the home appliance has been registered, connecting the home appliance to a wireless network corresponding to wireless network information about the registered home appliance;
  when the home appliance has not been registered, setting the wireless mode to a concurrent mode or an access point (AP) mode, and waiting to receive the wireless network searching request from the terminal device;
  upon receiving the wireless network searching request from the terminal device, connecting the home appliance to the terminal device and a wireless network based on wireless network information received from the terminal device; and
  deactivating the AP mode as the wireless mode.

5. The home appliance connection method of claim 2, wherein the periodically transmitting the beacon message further includes changing a period value at which the beacon message is transmitted.

6. The home appliance connection method of claim 1, wherein the method further comprises:
  receiving, from the terminal device, a probe request message for wireless network search based on an active scanning scheme;
  in response to the receipt of the probe request message, transmitting a probe response message to the terminal device; and
  connecting the terminal device and the home appliance associated with the terminal device with each other, based on the probe request message and the probe response message.

7. A home appliance connection device comprising:
  a controller configured to periodically search for a wireless network, when a wireless mode of the controller is a station mode;
  a receiver configured to receive a wireless network searching request from a terminal device; and
  a transmitter configured to transmit information about a searched wireless network to the terminal device,
  wherein the receiver is further configured to receive information about a wireless network searched by the terminal device,
  wherein in the information about the wireless network searched by the terminal device, a wireless network not associated with a home appliance associated with the terminal device is excluded in a filtered manner.

8. The home appliance connection device of claim 7, wherein when the wireless mode of the controller is the station mode, the transmitter is further configured to periodically change the wireless mode to an access point (AP) mode, and then periodically transmit a beacon message to the terminal device under the AP mode.

9. The home appliance connection device of claim 7, wherein the receiver is further configured to receive a first advertising message from the terminal device via Bluetooth communication, wherein the first advertising message includes a registration request of the home appliance,
  wherein the transmitter is further configured to transmit a second advertising message to the terminal device via Bluetooth communication, in response to the receipt of the first advertising message, and
  wherein the controller is further configured to search for a wireless network in response to the reception of the first advertising message.

10. The home appliance connection device of claim 7, wherein the controller is further configured to:
  power on the home appliance associated with the terminal device;
  identify whether the home appliance has been registered;
  when the home appliance has been registered, connect the home appliance to a wireless network corresponding to wireless network information about the registered home appliance;
  when the home appliance has not been registered, set the wireless mode to a concurrent mode or an access point (AP) mode, wherein the receiver waits to receive the wireless network searching request from the terminal device;
  when the receiver has received the wireless network searching request from the terminal device, connect the home appliance to the terminal device and a wireless network based on wireless network information received from the terminal device; and
  deactivate the AP mode as the wireless mode.

11. The home appliance connection device of claim 8, wherein the controller is further configured to change a period value at which the beacon message is transmitted.

12. The home appliance connection device of claim 7, wherein the receiver is further configured to receive, from the terminal device, a probe request message for wireless network search based on an active scanning scheme,
  wherein the transmitter is further configured to transmit a probe response message to the terminal device, in response to the receipt of the probe request message, and
  wherein the controller is further configured to connect the terminal device and the home appliance associated with the terminal device with each other, based on the probe request message and the probe response message.

13. A home appliance connection device comprising:
  a controller configured to periodically search for a wireless network, when a wireless mode of the controller is a station mode;
  a receiver configured to receive a wireless network searching request from a terminal device; and
  a transmitter configured to transmit information about a searched wireless network to the terminal device,
  wherein when the wireless mode of the controller is the station mode, the transmitter is further configured to periodically change the wireless mode to an access point (AP) mode, and then periodically transmit a beacon message to the terminal device under the AP mode.

14. The home appliance connection device of claim 13, wherein the controller is further configured to change a period value at which the beacon message is transmitted.

* * * * *